US008831580B2

(12) United States Patent
Bender et al.

(10) Patent No.: US 8,831,580 B2
(45) Date of Patent: Sep. 9, 2014

(54) SYSTEMS AND METHODS OF INITIATING A CALL

(75) Inventors: Douglas F. Bender, Scotts Valley, CA (US); Mark S. Hewitt, Sarasota, FL (US)

(73) Assignee: Hipcricket, Inc., New York, NY (US)

( * ) Notice: Subject to any disclaimer, the term of this patent is extended or adjusted under 35 U.S.C. 154(b) by 1049 days.

(21) Appl. No.: 12/538,687

(22) Filed: Aug. 10, 2009

(65) Prior Publication Data

US 2010/0048191 A1    Feb. 25, 2010

Related U.S. Application Data

(60) Provisional application No. 61/089,097, filed on Aug. 15, 2008.

(51) Int. Cl.
*H04M 3/42* (2006.01)

(52) U.S. Cl.
USPC ........ 455/416; 455/445; 455/414.1; 455/418; 455/466

(58) Field of Classification Search
USPC .............. 455/445, 432.1, 428, 416, 401, 406, 455/414.1, 404.2, 466, 418; 370/351, 352
See application file for complete search history.

(56) References Cited

U.S. PATENT DOCUMENTS

| 6,771,953 | B1 * | 8/2004 | Chow et al. ................... 455/417 |
| 6,886,027 | B2 * | 4/2005 | Tajiri et al. ..................... 709/202 |
| 7,046,658 | B1 * | 5/2006 | Kundaje et al. ............... 370/352 |
| 7,570,630 | B1 * | 8/2009 | Phillips et al. ................ 370/352 |
| 8,165,572 | B1 * | 4/2012 | Kirchhoff et al. ............. 455/417 |
| 2003/0064716 | A1 * | 4/2003 | Gailey et al. .................. 455/414 |
| 2003/0069934 | A1 * | 4/2003 | Garcia-Martin et al. ..... 709/206 |
| 2004/0240430 | A1 * | 12/2004 | Lin et al. ........................ 370/352 |
| 2006/0005033 | A1 * | 1/2006 | Wood ............................ 713/182 |
| 2006/0183489 | A1 * | 8/2006 | Modeo .......................... 455/466 |
| 2006/0205404 | A1 * | 9/2006 | Gonen et al. ............... 455/432.1 |
| 2006/0227957 | A1 * | 10/2006 | Dolan et al. ............. 379/212.01 |
| 2007/0015535 | A1 * | 1/2007 | LaBauve et al. ........... 455/552.1 |
| 2007/0049245 | A1 * | 3/2007 | Lipman ........................ 455/406 |
| 2007/0049329 | A1 | 3/2007 | Mayer et al. |
| 2007/0167167 | A1 * | 7/2007 | Jiang ............................. 455/453 |
| 2007/0177580 | A1 * | 8/2007 | Ragona et al. ................ 370/352 |

(Continued)

FOREIGN PATENT DOCUMENTS

| EP | 1885104 A1 | 2/2008 | |
| GB | 2445032 | * 3/2007 | ............. H04L 12/28 |
| WO | 20070091264 A1 | 8/2007 | |

OTHER PUBLICATIONS

PCT/US2009/053457 International Search Report, dated Apr. 8, 2010, 3 pages.

*Primary Examiner* — Kashif Siddiqui
*Assistant Examiner* — Mong-Thuy Tran
(74) *Attorney, Agent, or Firm* — David G. Rosenbaum; J. Peter Paredes; Rosenbaum IP, P.C.

(57) ABSTRACT

Systems, methods and processor-readable media for initiating a call are disclosed. A particular system includes an access interface to receive a data message including a destination address from a mobile communication device. The system also includes a communication bridge responsive to the access interface. The communication bridge initiates a first call to the mobile communication device and initiates a second call to the destination address in response to the data message. The communication bridge bridges the first call to the second call.

25 Claims, 17 Drawing Sheets

(56) References Cited

U.S. PATENT DOCUMENTS

| | | | |
|---|---|---|---|
| 2007/0183397 A1* | 8/2007 | Bennett | 370/352 |
| 2007/0201646 A1* | 8/2007 | Metcalf | 379/142.01 |
| 2007/0217582 A1* | 9/2007 | Lesser | 379/121.04 |
| 2007/0223679 A1* | 9/2007 | Chatterjee et al. | 379/211.02 |
| 2007/0238472 A1* | 10/2007 | Wanless | 455/461 |
| 2007/0253545 A1* | 11/2007 | Chatterjee et al. | 379/211.02 |
| 2007/0275702 A1* | 11/2007 | Hwang | 455/414.1 |
| 2007/0280464 A1* | 12/2007 | Hughes et al. | 379/205.01 |
| 2007/0293212 A1* | 12/2007 | Quon et al. | 455/420 |
| 2008/0037729 A1* | 2/2008 | Mobin et al. | 379/88.17 |
| 2008/0056239 A1* | 3/2008 | Loingtier | 370/352 |
| 2008/0062997 A1* | 3/2008 | Nix | 370/395.2 |
| 2008/0113649 A1* | 5/2008 | Ibacache et al. | 455/410 |
| 2008/0123686 A1* | 5/2008 | Lee et al. | 370/466 |
| 2008/0139210 A1 | 6/2008 | Gisby et al. | |
| 2008/0207190 A1* | 8/2008 | Altberg et al. | 455/422.1 |
| 2008/0253543 A1* | 10/2008 | Aharon | 379/201.12 |
| 2008/0267377 A1* | 10/2008 | Siegrist | 379/201.02 |
| 2009/0003316 A1* | 1/2009 | Lee et al. | 370/352 |
| 2009/0073960 A1* | 3/2009 | Kalaboukis | 370/352 |
| 2009/0147778 A1* | 6/2009 | Wanless et al. | 370/389 |
| 2009/0245179 A1* | 10/2009 | Liu et al. | 370/328 |
| 2009/0281901 A1* | 11/2009 | Lin et al. | 705/14.64 |
| 2010/0197288 A1* | 8/2010 | Camilleri et al. | 455/416 |

* cited by examiner

400

MyGlobalTalk™
Connect with the world

Call Anywhere in the World
for as low as 2 cents per minute from any phone!

---

About MyGlobalTalk.com | Plans | Products | Rates | My Account | Country Search | Customer Service JOIN TODAY and turn you Phone into a WORLD phone!

( Learn How to Save Today )

NO MINIMUMS
NO CONNECTION FEES
NO MONTHLY FEES!

( Award Winning Global Talk Technology )

MyGlobalTalk™
Wins the 2007
Internet Telephony
Product of the
Year Award

Benefits and Advantages

Imagine using your mobile or home phone to call Hong Kong, London, Sydney, Paris, for as long as you want...for only pennies per minute. Now you can with MyGlobalTalk.com It's that easy to save money...and you will! Turn your phone into an unlimited savings plan in the U.S. too! Add your MyGlobalTalk.com number as one of your "faves" and call anyone in the U.S. all day, everyday, without using your cell plan minutes!

( Read Press Release )

( Click here to see a list of supported phones! )

---

International Rates
And the best part is...it's so ridiculously inexpensive!
Imagine calling around the world, as often as you wish.
And for as low as 2 cents per minute from any phone!

What country are you calling?

| Select A Country ▼ | Search |

This is how it works:

1. Send a text message to the designated short code 55358 with the key word "MyGlobalTalk" in the body of the message; then click on the link received back from your text message and download and install the application.
2. CLICK HERE to sign up for MyGlobalTalk.com
3. Now, just being dialing calls by dialing 011 for your international calls (the international access code from the U.S.) and 1 plus the 10-digit number for US/Canada calls. MyGlobalTalk will automatically route your call thru our international calling network and you will begin saving up to 90% or more on your international and domestic long distance phone calls.

402

---

Home | About MyGlobalTalk | Plans | Products | Rates | My Account | Country Search | Customer Service

SYSTEMS AND METHODS OF INITIATING A CALL

CLAIM OF PRIORITY

This application claims priority from U.S. Provisional Patent Application No. 61/089,097, filed on Aug. 15, 2008, which is incorporated herein by reference in its entirety.

FIELD OF THE DISCLOSURE

The present disclosure is generally related to initiating a call.

BACKGROUND

Some individuals and businesses find that mobile communications devices provide desirable features, such as the ability to communicate during travel or when away from access to landline communications. Additionally, some calls made via mobile communication devices can be cheaper or more convenient than calls made via a landline telephone. However, some calls made using a mobile communication device can be more expensive than calls made via a landline and may have more limited features. Hence, there is a need for improved systems and methods of initiating calls.

BRIEF DESCRIPTION OF THE DRAWINGS

FIG. 4 is a diagram of a first embodiment of a user interface for initiating a call;

DETAILED DESCRIPTION

Systems, methods and processor-readable media for initiating a call are disclosed. In a particular embodiment, a system for initiating a call includes an access interface to receive a data message including a destination address from a mobile communication device. The system also includes a communication bridge responsive to the access interface. The communication bridge initiates a first call to the mobile communication device and initiates a second call to the destination address in response to the data message. The communication bridge bridges the first call to the second call.

In another particular embodiment, a mobile communication device includes an input device to receive input indicating a destination communication address. The mobile communication device also includes a call routing module to generate a data message based at least partially on the destination communication address. The mobile communication device further includes a transceiver to send the data message to a communication server, and to receive a callback from the communication server in response to the data message.

In another particular embodiment, a processor-readable medium includes instructions that, when executed by a processor, cause the processor to generate a data message based at least partially on input indicating a destination address. The processor-readable medium also includes instructions that, when executed by the processor, cause the processor to send the data message to a communication server. In response to the data message, the communication server initiates a callback to a mobile communication device and a call to the destination address.

In another particular embodiment, a method includes receiving input at a mobile communication device, the input indicating a destination address. The method also includes generating a data message based at least partially on the destination address. The method further includes sending the data message to a communication server. In response to the data message, the communication server initiates a callback to the mobile communication device and a call to the destination address.

Figure 1:
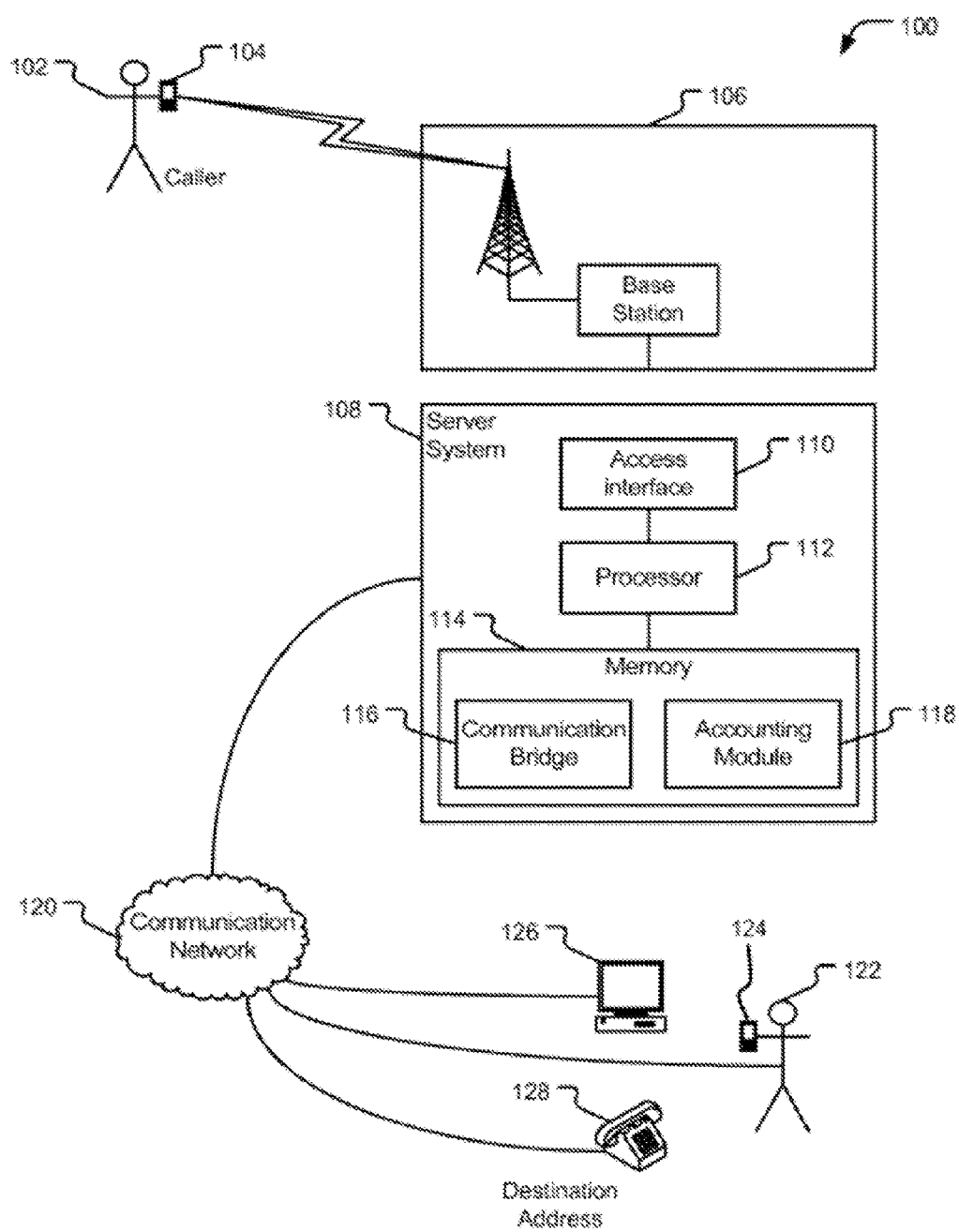
FIG. 1 is a diagram of a first embodiment of a system to initiating a call.

FIG. 1 illustrates a first embodiment of a system to initiate a call, the system designated generally 100. A user 102 of the system 100 may utilize a mobile communication device 104 that is adapted to communicate via wireless communication system 106. For example, the wireless communication system 106 may include a wireless communication network (such as a 3G network, a GSM network, a GPRS network, an EDGE network, a WiFi network, or another wireless communication network) provided by a wireless communication provider; a WiFi network available at the user's location; a WiFi network available in a "WiFi Hotspot", etc. The user 102 may utilize the mobile communication device 104 to initiate a call to a communication address associated with a second user 122.

In a particular embodiment, the wireless communication system 106 can communicate with a server system 108. The server system may be adapted to bridge communications between the wireless communication system 106 and one or more other communication networks 120. While a single server system 108 is illustrated, the term "system" includes any collection of systems or sub-systems that individually or jointly execute a set, or multiple sets, of instructions to perform one or more of the functions described herein. The communication network 120 enables Internet Protocol (IP) communication with a user device of the second user 122. For example, the user device associated with the second user 122 may include a computer 126, a wireless communication device 124, a wired communication device 128, another communication device, or any combination thereof. In a particular embodiment, the communication network 120 includes one or more bridging devices or systems to convert data received from the mobile communication device 104 to another communication protocol. For example, the communication network 120 (or the server system 108) may receive IP communications and convert the IP communications for transmission to a Public Switched Telephone Network (PSTN) or another communication network.

The server system 108 includes an access interface 110 to facilitate communication with the wireless communication system 106. The access interface 110 is adapted to receive calls to a communication address associated with the access interface 110. For example, a call to the communication address associated with the access interface 110 may be automatically initiated by the mobile communication device 104 in response to an automatic determination at the mobile communication device 104 to route the call via the access interface 110. To illustrate, when the user 102 provides input specifying a call, the mobile communication device 104 may automatically determine to route the call as a Voice over Internet Protocol (VoIP) call based on an evaluation of a destination address of the call.

In a particular embodiment, the server system 108 includes a processor 112 and memory 114 accessible to the processor 112. The memory 114 may include a plurality of modules 116-118 that are executable by the processor 112 to implement various functions of the server system 108. In various illustrative embodiments, the modules 116-118 can be implemented as hardware, firmware, software, or any combination thereof.

In a particular embodiment, the memory 114 can include a communication bridge 116, such as a VoIP telephony bridge. The VoIP telephony bridge may receive a call via the wireless communication system 106 and, in response to the call, communicate with a second device, such as a user device associated with the second user 122. For example, when the communication bridge 116 includes a VoIP telephony bridge, the VoIP telephony bridge may receive a destination communication address from the mobile communication device 104. The VoIP telephony bridge may initiate a call to the destination communication address and convert voice call data received from the mobile communication device 104 to a VoIP call data for transmission to the destination communication address. For example, the VoIP telephony bridge may convert signals received in a mobile telephony protocol from the mobile communication device 104 into VoIP signals for transmission to the destination communication address. The VoIP telephony bridge may also convert VoIP signals received from the destination communication address to mobile telephony protocol signals for transmission to the mobile communication device 104.

In a particular embodiment, the communication bridge 116 may facilitate non-voice data communications between the mobile communication device 104 and a second device, such as the device associated with the destination address (e.g., the computer 126, the wireless communication device 124, the wired communication device 128, or another communication device). For example, after the communication bridge 116 has established a communication link between the mobile communication device 104 and the second device, the mobile communication device 104 may access data stored at the second device, the second device may access data stored at the mobile communication device 104, the second device may send data to the mobile communication device 104, the mobile communication device 104 may send data to the second device, or any combination thereof. The data can include voice data, non-voice data, or any combination thereof. For example, the data can include multimedia data, text data, graphics data, and so forth. To illustrate a few non-limiting examples, the data can include contact list information, photographs, videos, executable program applications, web pages, or any other type of information.

In a particular embodiment, the memory 114 includes an accounting module 118. The accounting module 118 can authenticate the mobile communication device 104 based on authentication information received from the mobile communication device 104. For example, the mobile communication device 104 or the wireless communication system 106 may send authentication information to the server system 108 to validate that the mobile communication device 104 is authorized to send calls via the communication bridge 116. In a particular embodiment, a user access telephone number can be associated with a user account record accessible to the accounting module 118. When a call is received at the server system 108 via the user access telephone number, the accounting module 118 may compare caller identification information associated with the call to an authorized telephone record of the user account record. If the caller identification information is associated with an authorized telephone that is related to the user access telephone number, the call is authenticated and the communication bridge 116 may be invoked to bridge the call to the destination communication address.

Figure 2:
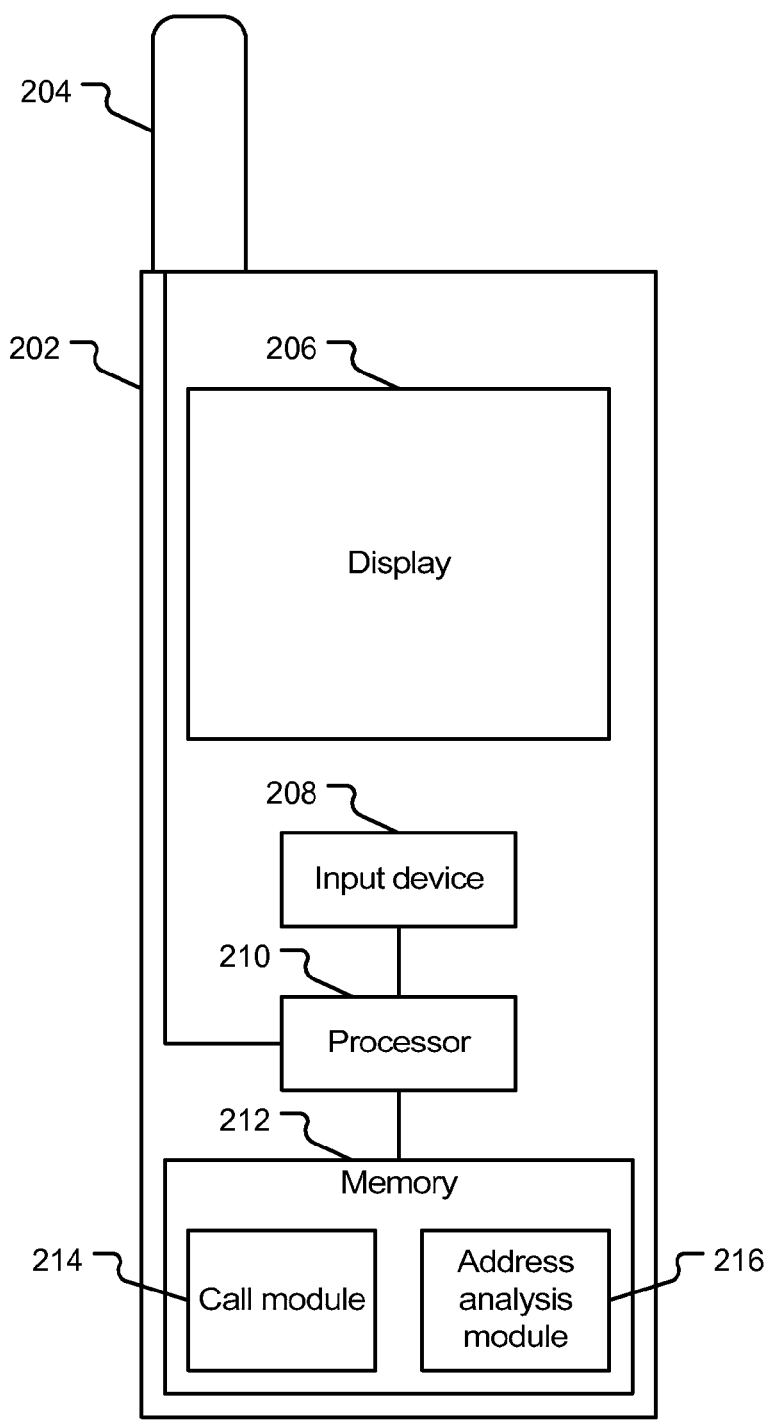
FIG. 2 is a diagram of a second embodiment of a system to initiating a call.

FIG. 2 illustrates a second particular embodiment of a system to initiate a call. The system includes a mobile communication device 202. The mobile communication device 202 includes an antenna 204 adapted to send and receive wireless communications signals using a wireless communication protocol. The mobile communication device 202 also includes a display 206 and an input device 208. The input device 208 may receive input indicating a destination communication address, such as a telephone number, a Short Messaging Service (SMS) address, a web site address, etc. The input device 208 may include a microphone, a keypad, a touch screen, one or more soft buttons, other input devices, or any combination thereof.

In a particular embodiment, the mobile communication device 202 includes a processor 210 and memory 212 accessible to the processor 210. For example, the mobile communication device 202 may include a computer-readable medium in which one or more sets of instructions (e.g. software) are embedded. The instructions may embody one or more of the methods or logic described herein. In a particular embodiment, the instructions may reside completely or partially within the memory 212, another memory (not shown), or the processor 210. For example, the memory 212 can include one or more modules adapted to implement various functions of the mobile communication device 202. The modules can be implemented in hardware, software, or any combination thereof. For example, the memory 212 can include one or more software applications that, when executed by the processor 210, implement the functions of the one or more modules. In an alternative embodiment, dedicated hardware implementations, such as application specific integrated circuits, programmable logic arrays or other hardware devices, can be constructed to implement one or more of the methods described herein.

In a particular embodiment, the mobile communication device 202 includes an address analysis module 216. The address analysis module 216 may be adapted to determine whether a destination communication address received at the mobile communication device 202 is of a predetermined type. In a particular embodiment, the predetermined type of destination address may be determined based on user configuration settings. For example, the user configurations settings may indicate that the predetermined type of destination address includes international telephony addresses, long distance telephony addresses, local telephony addresses, other telephony addresses, Internet addresses, Universal Resource Identifier (URI) addresses, electronic messaging addresses (e.g., an SMS, Multimedia Messaging service (MMS) addresses, or email addresses), or any combination thereof. In a particular embodiment, the address analysis module 216 analyzes alpha-numerical digits of the destination communication address to determine whether the destination communication address is of the predetermined type. In another particular embodiment, the address analysis module 216 compares the destination communication address to one or more destination communication address patterns. The destination communication address patterns can include features that indicate whether the communication address is of a predetermined type. For example, the destination communication address patterns can identify international calls based on the number of digits in the destination communication address. In another example, the destination communication address patterns can identify long-distance calls based on the presence of an area code or the presence of a particular area code in the destination communication address. In still another example, the destination communication address patterns can identify an electronic messaging address or Internet address based on the presence of a URI scheme (e.g., Hypertext Transfer Protocol (HTTP), mailto, File Transfer Protocol (FTP), etc.), or based on other syntax or semantics indicating that the destination communication address is a URI.

The mobile communication device 202 can also include a call module 214. The call module 214 may initiate a call to a communication bridge when the destination communication address is of the predetermined type. The call module 214 can also send an instruction to the communication bridge to initiate or route a communication to the destination communication address. In a particular embodiment, the communication bridge includes a Voice over Internet Protocol (VoIP) telephony bridge, and the call module 214 is also adapted to send voice communication data to the VoIP telephony bridge to be converted to VoIP data for communication to the destination address. For example, the call module 214 can communicate with the VoIP telephony bridge using a wireless communication protocol.

The call module 214 may also be adapted to access non-voice data via the communication bridge. For example, the call module may receive non-voice data from a device associated with the destination address after a communication link to the destination address has been established by the communication bridge. The call module 214 may be adapted to receive the data and to store the data in the memory 212 for access by another portion of the mobile communication device 202. For example, the call module 214 may receive image data via the communication bridge and store the image data at the memory 212 where the image data can be accessed by an image viewer element (not shown) of the mobile communication device 202. In another example, the call module 214 may receive contact list data via the communication bridge and store the contact list data at the memory 212 where the contact list data can be accessed by an address book manager element (not shown) of the mobile communication device 202.

Figure 3:
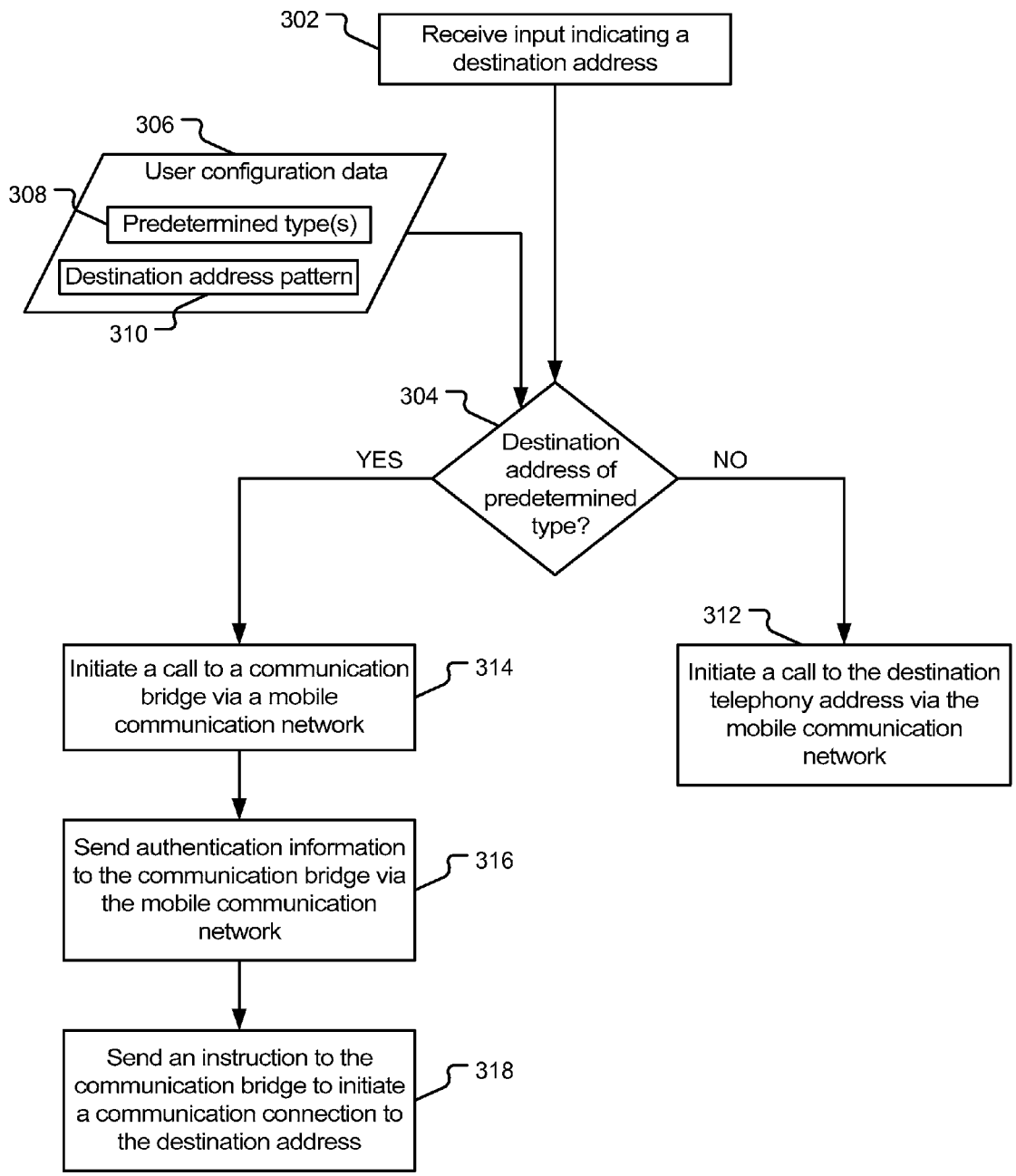
FIG. 3 is a flow chart of a first embodiment of a method of initiating a call.

FIG. 3 illustrates a first particular embodiment of a method of initiating a call. The method is designated generally 300. In various illustrative embodiments, the method 300 may be implemented by a mobile communication device, such as the mobile communication device 104 of FIG. 1 or the mobile communication device 202 of FIG. 2. The method 300 may include, at 302, receiving, at a mobile communication device, input indicating a destination communication address. For example, the input can include a series of digits entered via a keypad of the mobile communication device, input selecting a communication address from a memory (e.g., from a contact list or speed dial list), a voice input, any other input indicating a destination address, or any combination thereof.

The method 300 may also include, at 304, determining whether the destination communication address is of a predetermined type 308. The method 300 may include accessing user configuration data 306 to determine which types of calls are of the predetermined type(s) 308. The user configuration data 306 can include information defining the predetermined type(s) 308 of destination communication addresses. For example, the predetermined types 308 may include international telephone numbers, long-distance telephone numbers, local telephone numbers, other types of telephone numbers, data addresses (e.g., Universal Resource Identifiers (URI)), network addresses, electronic messaging addresses, or any combination thereof. In another particular embodiment, the user configuration data 306 may specify one or more destination communication address patterns 310. For example, the destination communication address patterns 310 can include information sufficient to identify a particular type of call, such as an international call or long-distance call. To illustrate, the destination communication address patterns 310 may indicate that calls that include an international calling code are of the predetermined type 308. In another example, the destination communication address patterns 310 can indicate that calls that include particular area codes are of the predetermined type 308. In a particular embodiment, whether the destination communication address of a call is of a predetermined type 308 may be determined by analyzing alpha-numerical digits of the destination communication address.

When the destination communication address is of the predetermined type 308, the method 300 includes, at 314, initiating a call to a communication bridge via a mobile communication network. That is, although the destination communication address was entered at the mobile communication device, a call may be initiated to the communication bridge, which has a communication address that is different than the destination communication address. The method 300 also includes, at 316, sending authentication information to the communication bridge via the mobile communication network. For example, the authentication information can include caller identification information. In another example, the authentication information can include a key or other authentication data stored in a memory of the mobile communication device.

The method may also include, at 318, sending an instruction to the communication bridge to initiate a communication connection to the destination communication address. When the communication connection has been established, the communication bridge may convert communication data received from the mobile communication device in a first communication protocol (e.g., a mobile communication protocol) to a second communication protocol (e.g., a Voice over Internet Protocol) for communication to the destination communication address. Similarly, the communication bridge may convert communication data received from the destination communication address in the second protocol to the first protocol for transmission to the mobile communication device.

When the destination communication address is not of the predetermined type 308, the method 300 may include, at 312, initiating a call to the destination communication address via the mobile communication network. For example, the call can be connected to the destination communication address via a wireless communication network, a Public Switched Telephone Network (PSTN), or both. That is, the destination communication address may be dialed normally from the mobile communication device, without going through the communication bridge.

In a particular embodiment, the method 300 allows a call to be automatically placed to any destination communication address as a Voice over Internet Protocol (VoIP) call by routing the call through the communication bridge as a VoIP call. The method 300 does not require that a user dial a telephony address of the communication bridge to initiate a call via the communication bridge. Rather, the method 300 determines whether the call is to a particular predetermined type 308 of destination address. When the call is to a predetermined type 308 of destination address, the call is automatically routed via the communication bridge. The destination communication address is passed to the communication bridge to initiate a communication connection to the destination communication address. The method 300 also does not require the user to enter an access code associated with the communication bridge to initiate communication via the communication bridge. Rather, the method 300 can automatically send authentication data from a memory of the mobile communication device to authenticate the mobile communication device to use the communication bridge.

FIG. 4 illustrates a first embodiment of a user interface of a system to initiate a call. The user interface is designated generally 400. The user interface 400 includes a user selectable element 402 that allows a user to generate a user account to provide access to a communication bridge. The user interface 400 also includes information about a service providing access to the communication bridge for making calls.

Figure 5:
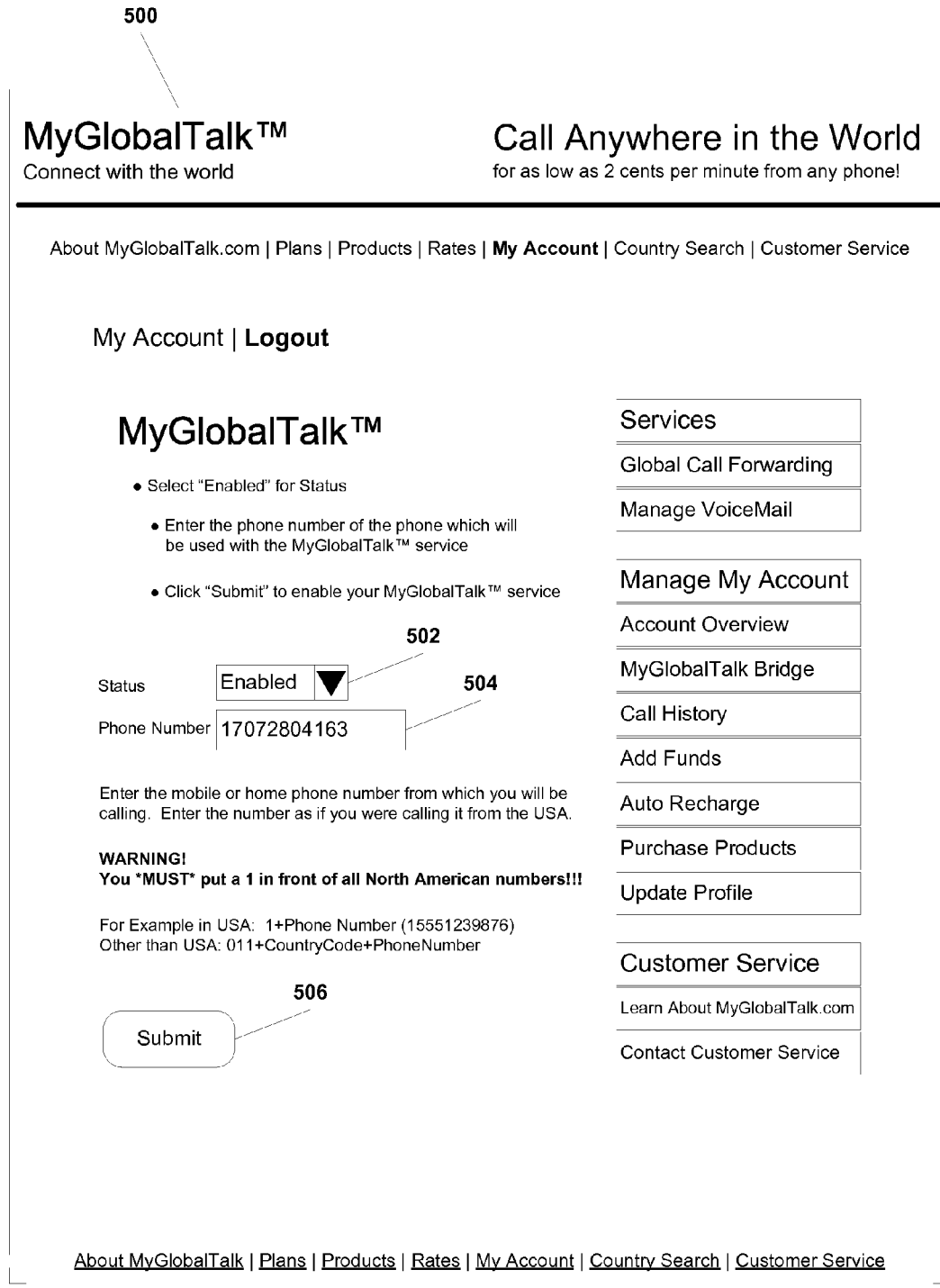
FIG. 5 is a diagram of a second embodiment of a user interface for initiating a call.

FIG. 5 is a diagram of a second embodiment of a user interface of a system to initiate a call. The user interface is designated generally 500. The user interface 500 includes an input element 504 that enables a user to input a telephone number to be associated with a user account that is authorized to communicate via a communication bridge. The telephone number provided can be used to authenticate a call to the communication bridge by comparing the provided telephone number to caller identification information received via the call to the communication bridge. The user interface 500 also includes a selectable element 502 that is selectable by the user to enable or disable access to the communication bridge. The user interface 500 also includes a selectable element 506 to save changes that have been made via the user interface 500.

Figure 6:
FIG. 6 is a diagram of a third embodiment of a user interface for initiating a call.

FIG. 6 is a diagram of a third embodiment of a user interface of a system to initiate a call. The user interface is designated generally 600. The user interface 600 includes user input element(s) 602 to receive input indicating a user access telephone number associated with a communication bridge. The user access telephone number is an access number assigned to the user and associated with the user's account. A call placed to the user access telephone number may be received by the communication bridge or an associated server system. When the user is authorized to communicate via the communication bridge, the call to the communication bridge may be forwarded to a destination communication address via an appropriate communication protocol.

The user interface 600 also includes user input element(s) 604 to receive a telephone number associated with a telephone authorized to access the communication bridge. The telephone number associated with the authorized telephone can be used by the communication bridge or the associated server system to authenticate that a particular telephone is authorized to communicate via the communication bridge. The telephone number associated with the authorized telephone can also be used by the communication bridge or the associated server system to relate a call to a customer account for billing purposes. The user interface 600 also includes a user selectable element 606 to save changes made via the user interface 600. For example, when the user selectable element 606 is selected, changes made via the user interface 600 can be used to update a customer account record.

A particular embodiment is illustrated by the MYGLOBALTALK™ communication service available from i2 Telecom International, Inc. The MYGLOBALTALK™ communication service places Internet telephony in the hands of cell phone users, independent of wireless carrier technology, handset manufacturer, or the type of wireless carrier voice/data plan involved. In addition, The MYGLOBALTALK™ communication service is fully functional without local access to the Internet or proximity to an Internet "hotspot". Users also need not wait for the availability of a dual-mode WiFi phone, because the MYGLOBALTALK™ communication service provides the benefits of a dual-mode phone at a fraction of the cost using the customer's existing mobile handset.

The MYGLOBALTALK™ communication service is compatible with smart phone handsets and with other application enabled handsets, such as Java-enabled handsets, standard landline phones, and other communication devices. In a particular embodiment, the MYGLOBALTALK™ communication service includes a mobile application and a branded web site (exemplary embodiments of which are illustrated in FIGS. 4-6). The MYGLOBALTALK™ communication service enables mobile users to access the Internet (e.g., for Internet telephony communications, electronic messaging, or web site access) in an "untethered" manner via a phone that is enabled to access the MYGLOBALTALK™ communication service.

With the MYGLOBALTALK™ communication service, users are not required to change their traditional dialing procedures. Rather, users may enter a destination communication address (e.g., dial a destination phone number) and their MYGLOBALTALK™ application on their telephone device automatically utilizes a communication bridge when appropriate. For example, cell phone users can use their cell phones for VoIP calling, without dialing access codes or making other changes to their normal dialing procedure. Additionally, users can designate when calls should be placed as VoIP calls. This allows the same handset to automatically place some calls as regular telephone calls and some as VoIP calls based on user specified settings.

In a particular embodiment, to initially access the MYGLOBALTALK™ communication service, a user may send a message, such as an SMS message, using a designated Common Short Code with an associated keyword. In response to the message, the user may receive a message that includes a link for downloading the MYGLOBALTALK™ communication service mobile application or widget ("the application"). The user may select the link to download the application to his/her mobile handset. Once the application has been downloaded, the user may install and launch the application for setup. When prompted by an install script, the user may enter a phone number that was selected at the time the user signed up for the MYGLOBALTALK™ communication service (e.g., a user access telephone number). Also during the installation and setup, the user can "ENABLE" the application. (It is worth noting that analysis, to date, indicates that enabling the application only results in minimal battery drain). Once these steps are complete, the user is finished with the setup phase, and the user may begin using the MYGLOBALTALK™ communication service.

In an illustrative example, a user may seamlessly dial international long distance calls via the MYGLOBALTALK™ communication service without needing to enter any extra digits or access codes. Rather, the user may dial as one would normally dial an international number on a land-line phone. Other options can be available to the user as well (e.g., via user configuration settings), such as:

1) Selectively using the MYGLOBALTALK™ communication service for:
   i. International calling
   ii. Domestic calling
   iii. Domestic long-distance calling
   iv. International & Domestic calling
   v. All Calling
   vi. Internet browsing and access
   vii. Electronic messaging
   viii. Other communications or combinations of the above;
2) MYGLOBALTALK™ communication service presence detection to detect a user's availability via the service;
3) MYGLOBALTALK™ communication service buddy lists;
4) MYGLOBALTALK™ communication service account sharing (e.g., for families, friends or businesses);
5) MYGLOBALTALK™ communication service party lines for conference calling;
6) MYGLOBALTALK™ communication service in-bound communications parsing or screening;
7) MYGLOBALTALK™ communication service neighborhood dialing for no cost communications when dialing from one number associated with the MYGLOBALTALK™ communication service to another number associated with the MYGLOBALTALK™ communication service;
8) MYGLOBALTALK™ communication service speed dials to input particular predefined communication addresses with a single click;
9) MYGLOBALTALK™ communication service v-bridge to direct dial VoIP users associated with other VoIP service providers, e.g., the SKYPE™ communication service, or GOOGLE TALK™ communication service;
10) MYGLOBALTALK™ communication service real-time or prompt (e.g., near real-time) feedback to the user regarding the cost of a communication in progress or just completed; and
11) MYGLOBALTALK™ communication service WiFi-cellular handoff where the user's call enabled by the MYGLOBALTALK™ communication service can seamlessly transition between a WiFi network and cellular (or other wide area wireless) network depending on quality and availability of the call. For example, when the user is on a call enabled by the MYGLOBALTALK™ communication service via a mobile network and the user enter a building where there is a "trusted" network", the user's communication device, executing a MYGLOBALTALK™ communication service application, may automatically initiate a WiFi connection to the trusted network. Once the WiFi connection has been established, the call can be handed off to the WiFi connection and the call via the mobile network can be dropped. Likewise, when the user is on a call enabled by the MYGLOBALTALK™ communication service initiated via a WiFi network and the user moves outside the WiFi zone, the call may be automatically and seamlessly handed off to a cellular network and the WiFi network call may be dropped.

One feature of the MYGLOBALTALK™ communication service relates to how the service takes advantage of the particular services offered by certain wireless carriers. While the MYGLOBALTALK™ communication service offers customers significant cost savings and is very easy to use, there are a number of carriers with certain branded features that, when coupled with the MYGLOBALTALK™ communication service, can substantially reduce the cost of these cellular plans. For example, many wireless carriers allow free calls to be made to certain preselected telephone numbers. Examples include T-Mobile's MYFAVES™ telecommunication service, Sprint's "Sprint-to-Home" service, AllTel's "myCircle" service, and so forth.

For example, a user may designate his or her MYGLOBALTALK™ communication service user access number as a preselected free calling number (e.g., a "home" or "favorite" number depending on the particular telecommunication service provider used). To illustrate, with T-Mobile's MYFAVES™ telecommunication service users can designate up to five (5) "favorite" numbers, with Sprint's Sprint-to-Home service users can designate a single number, or with AllTel's myCircle service users can designate up to ten (10) numbers. In each case, if a MYGLOBALTALK™ communication service user designates his or her MYGLOBALTALK™ communication service user access number as one of the designated numbers, then when the application is enabled and a call is automatically routed to the MYGLOBALTALK™ communication service communication bridge, the call does not subtract minutes from the user's cell phone calling plan. The savings for business travelers, students, military users, ex-patriates, etc., who need to make frequent international calls, can be very substantial. Using the MYGLOBALTALK™ communication service, these users can complete these calls from their mobile handsets without being charged per minute fees or using an allocation of free or prepaid minutes. By utilizing the MYGLOBALTALK™ communication service for all international calls plus domestic calls, or selecting the "All Calls" option, all of the user's calls can be completed without ever touching the user's cellular calling plan minutes. This feature may enable users to sign up for the minimum-cost plans offered by wireless carriers and yet still be able to make an unlimited number of international and domestic long-distance calls.

The application is simple to use and, once activated, does not require further adjustments. In a particular embodiment, the download and setup process utilizes standard SMS text messaging for acquiring the application and two simple data entry points during installation and setup.

Figure 7:
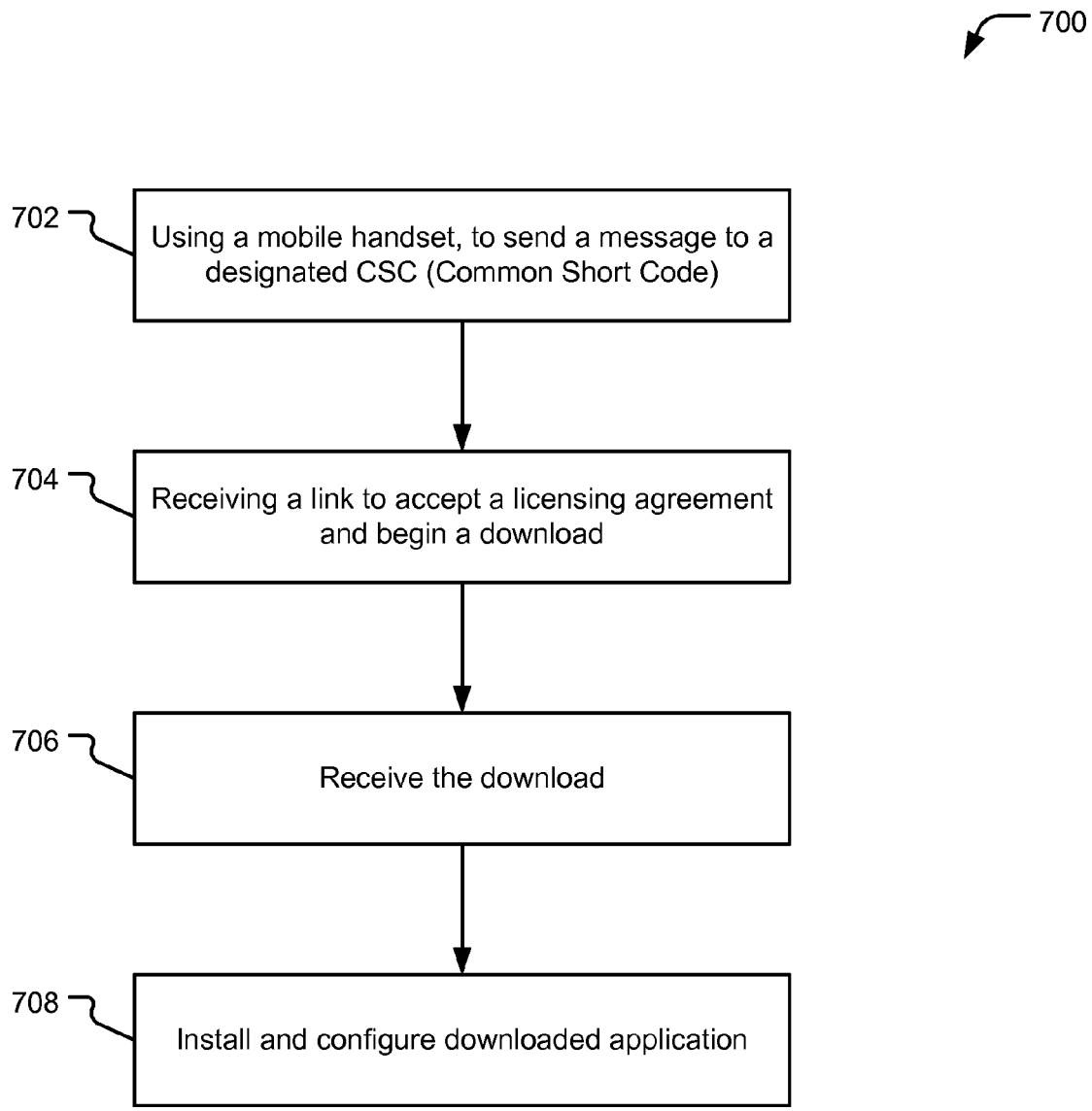
FIG. 7 is a flow chart of a second embodiment of a method of initiating a call.

FIG. 7 illustrates a particular embodiment of a method of downloading an application to enable a communication device to automatically route telephone calls via a communication bridge, such as a communication bridge used by the MYGLOBALTALK™ communication service, the method designated generally 700. The method 700 may include, at 702, using a communication device, such as a mobile handset, to send a message to a designated CSC (Common Short Code). For example, the message may include a keyword, such as "MyGlobalTalk", in a subject line or body of the message. In a particular embodiment, in response to the message, a server associated with the MYGLOBALTALK™ communication service may send a response to the mobile handset. The response may include a link that, when activated, connects the mobile handset to a download server. The method 700 also includes, at 704, receiving the link and selecting the link to accept the licensing agreement and begin the download. The method 700 also includes, at 706, receiving the download. For example, the download can include a MYGLOBALTALK™ communication service application ("the application") or an installation application or script that installs the application. The method 700 further includes, at 708, installing and configuring the application on the mobile handset.

Figure 8:
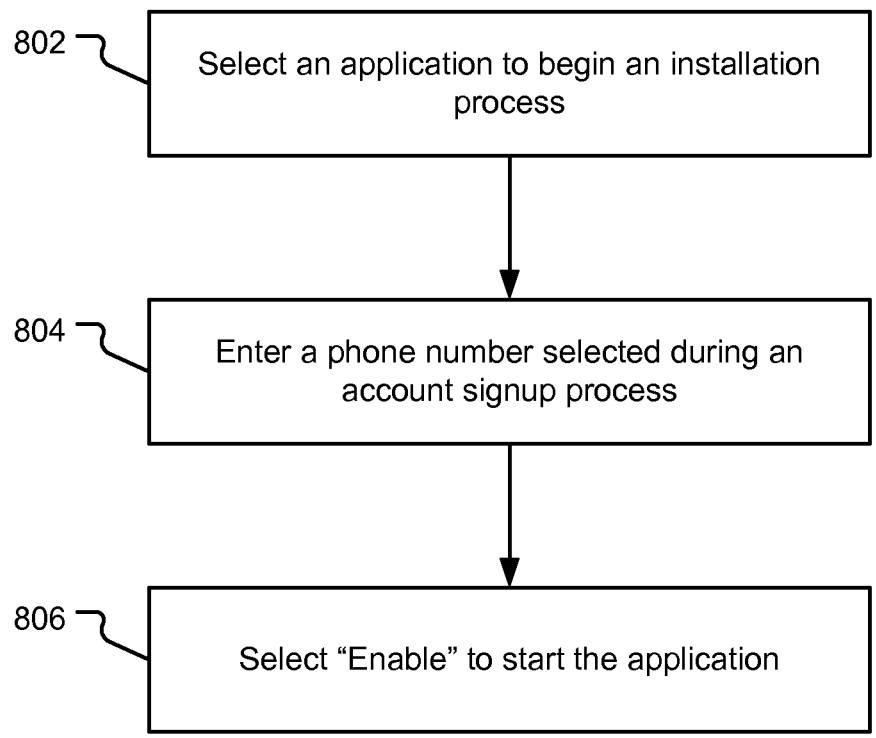
FIG. 8 is a flow chart of a third embodiment of a method of initiating a call.

FIG. 8 illustrates a particular embodiment of a method of downloading an application to automatically route calls to a communication bridge, such as a communication bridge used by the MYGLOBALTALK™ communication service. The method is designated generally 800. The method 800 may include, at 802, selecting an installation application to begin installation of a MYGLOBALTALK™ communication service application ("the application"). For example, the user may find the installation application in a memory of the mobile handset and click (or double-click) on the application to begin the installation process. The method 800 also includes, at 804, entering a phone number (e.g., a telephone number associated with the mobile handset and/or a user access number) that was selected during a signup process for the MYGLOBALTALK™ communication service. The method 800 also includes, at 806, selecting to enable the application.

Figure 9:
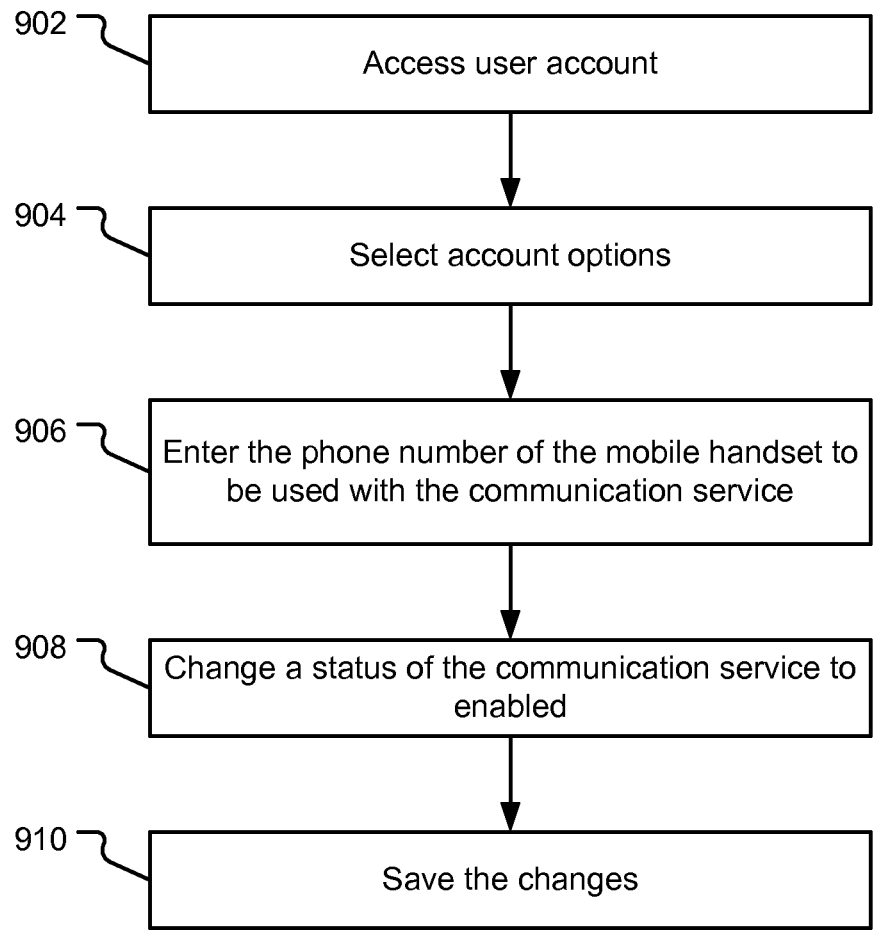
FIG. 9 is a flow chart of a fourth embodiment of a method of initiating a call.

FIG. 9 illustrates a particular embodiment of a method of setting up a user account to access a communication bridge, such as a communication bridge used by the MYGLOBALTALK™ communication service. The method is designated generally 900. The method 900 may include, at 902, accessing a user account associated with the MYGLOBALTALK™ communication service. For example, the user may log into an online account using a user name and password associated with the user's account. The method 900 may also include, at 904, selecting the MYGLOBALTALK™ communication service account options. The method 900 may include, at 906, entering a communication address (e.g., a phone number) associated with a mobile handset (or other communication device) that is to be used with the communication service. The method 900 may further include, at 908, changing a status of the communication service to enabled. The method 900 may also include, at 910, saving the changes to the account options. For example, the user may select a "submit" option. After the account set up process is complete, the communication service may be ready for use.

Figure 10:
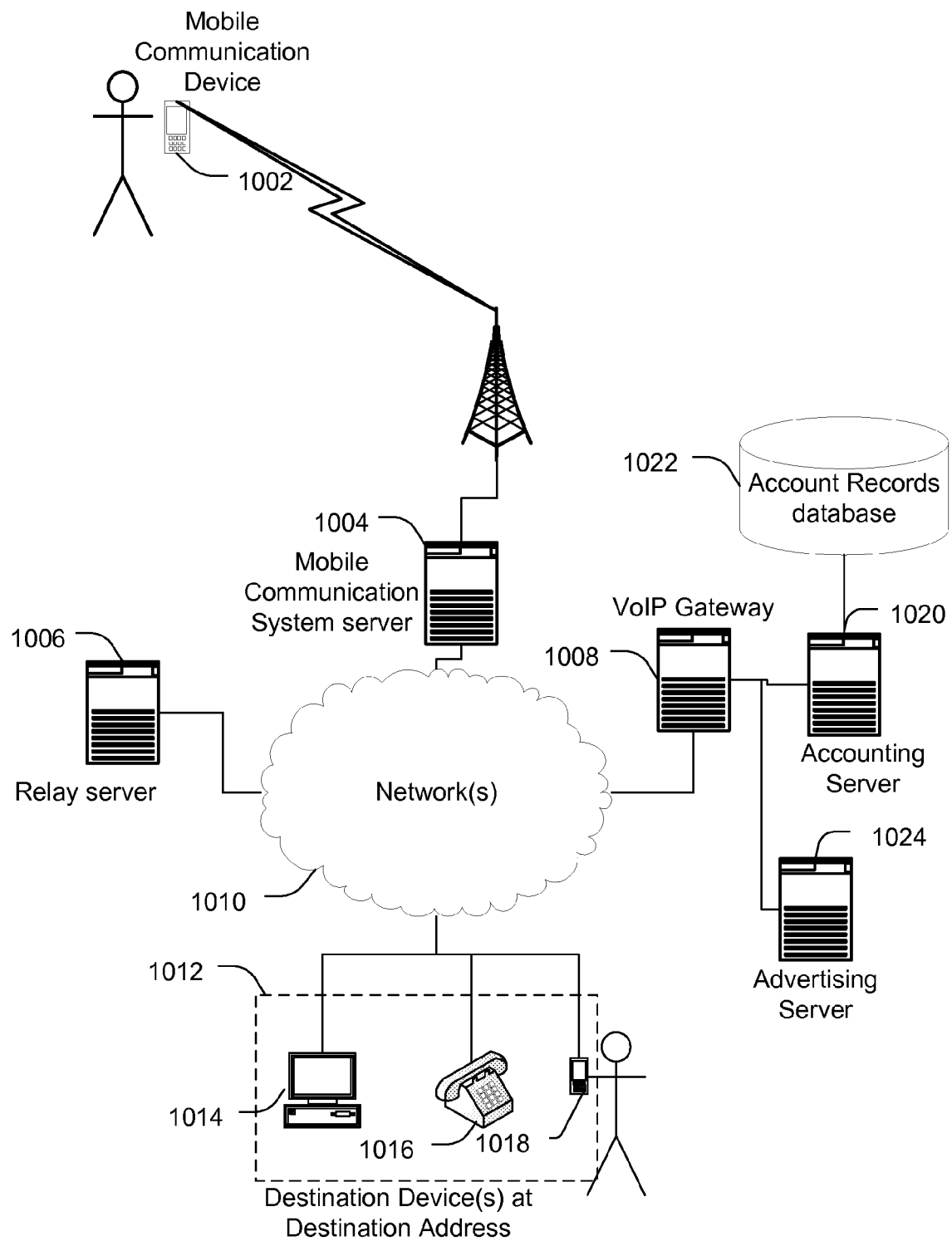
FIG. 10 is a diagram of a third embodiment of a system to initiating a call.

FIG. 10 depicts a particular embodiment of a system to initiate a call. The system includes a mobile communication device 1002 adapted to communicate via a mobile communication system. For example, the mobile communication device 1002 may include a mobile telephone device, a personal digital assistant (PDA), or another device adapted to communicate via the mobile communication system. The mobile communication system may include a mobile communication system server 1004 that is adapted to route user communication data via one or more networks 1010. The one or more networks 1010 may include a circuit switched network (e.g., a public switched telephone network (PSTN), a packet switched network (e.g., the Internet or another computer network), or any combination thereof.

In a particular embodiment, one or more destination devices 1012 may also be coupled to the one or more networks 1010 (either directly or indirectly). For example, the destination devices 1012 may include user computers 1014, telephones 1016, mobile telephones 1018, or other communication devices. In a particular embodiment, the destination devices 1012 are each associated with a destination address. A destination address is a communication address that is usable to address communications to one of the destination devices 1012. For example, a destination address may include a telephone number, an Internet Protocol (IP) address, common short code (CSC) address, another communication address, or any combination thereof.

The system may also include a Voice over Internet Protocol (VoIP) gateway 1008. The VoIP gateway 1008 may be adapted to connect communications between the mobile communication device 1002 and one or more of the destination devices 1012. In a particular embodiment, the VoIP gateway 1008 may be adapted to receive a data message from the mobile communication device 1002 via an access interface. The VoIP gateway 1008 may authenticate the data message based on authentication information received via the data message. For example, the VoIP gateway 1008 may decode all or a portion of the data message using an encryption key. The data message may include identification information of the mobile communication device 1002. Based on the identification information, the VoIP gateway 1008 may generate a callback to the mobile communication device 1002. The VoIP gateway 1008 may also generate a call to one or more of the destination devices 1012 based on a destination address in the data message. The VoIP gateway 1008 may bridge the call to the mobile communication device 1002 with the call to the destination device 1012.

In a particular embodiment, the system includes an accounting server 1020. The accounting server 1020 is adapted to generate a record associating the data message, the call to the mobile communication device 1002, the call to the destination device 1012, or any combination thereof with a user account. For example, the data record may be stored at an account records database 1022. The record may include information to identify the mobile communication device 1002, a type of the mobile communication device 1002, a location of the mobile communication device 1002, a location of the destination device 1012, an identification of the destination device 1012, a time of the call between the mobile communication device 1002 and the destination device 1012, a manner in which the mobile communication device 1002 sent the data message to the VoIP gateway 1008 (e.g., via an Internet Protocol (IP) message or a short messaging service (SMS) message), other information about the call, the mobile communication device 1002, the destination device 1012, the data message, or any combination thereof. The user account may be billed a fee based on the record. For example, the user account may be charged for a length of the call, the manner in which the data message was sent, the location of the destination device 1012, the location of the mobile communication device 1002, user account information (e.g., a calling plan), other factors, or any combination thereof. In an illustrative embodiment, the fee charged when the data message is received via an IP message may be different than a fee charged when the data message is received via an SMS message.

In a particular embodiment, after the mobile communication device 1002 sends the data message and before the call to the destination device 1012 is connected, the mobile communication device 1002 plays call progress tones. The call progress tones may include prerecorded sound data. For example, the call progress tones may be played from an audio file stored on the mobile communication device 1002. In another example, the system includes an advertising server 1024 to send a commercial message to mobile communication device 1002. The mobile communication device 1002 may play the commercial message as the call progress tones.

In a particular embodiment, the system includes a relay server 1006. The relay server 1006 may receive a short messaging service (SMS) message that includes at least a portion of the data message from the mobile communication device 1002. The relay server 1006 may send the data message to the access interface as an Internet Protocol (IP) message. For example, the relay server 1006 may send the data message when a received SMS message includes a predetermined keyword.

Figure 11:
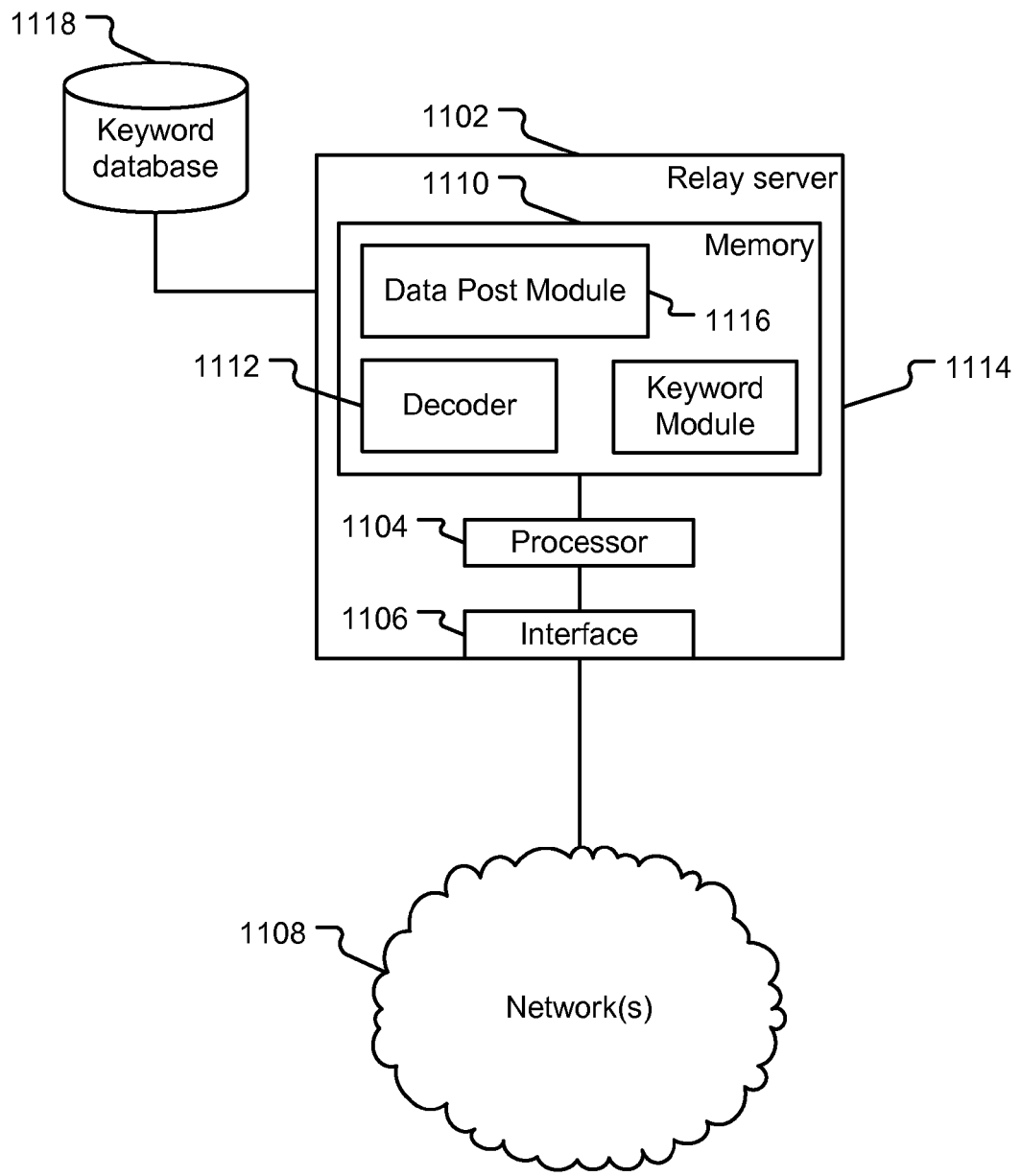
FIG. 11 is a diagram of a fourth embodiment of a system to initiating a call.

Referring to FIG. 11, a block diagram of a particular embodiment of a relay server 1102 is illustrated. The relay server 1102 may include a processor 1104 and memory 1110 accessible to the processor 1104. The relay server 1102 may also include an interface 1106 adapted to facilitate communication with one or more remote devices via a network 1108. In an illustrative embodiment, the relay server 1102 may be a relay server 1006 described with reference to FIG. 10 and the network 1108 may be one or more of the networks 1010 described with reference to FIG. 10. For example, the relay server 1102 may be adapted to receive a short messaging service (SMS) message via the network 1108. The SMS message may include a data message adapted to cause a Voice over Internet Protocol (VoIP) gateway to generate a callback to a mobile communication device that sent the SMS message.

The relay server 1102 may include a decoder 1112 adapted to decode an encrypted portion of the SMS message. For example, the SMS message may include information to identify the mobile communication device that sent the SMS message, a destination address, an authentication hash value, other information about the mobile communication device, the destination address, or any combination thereof. In a particular embodiment, at least a portion of the SMS message may be encrypted. For example, a hash value may include information associated with the SMS message encrypted with a key as an authentication value. In another example, information that is uniquely associated with the mobile communication device or destination address may be encrypted. The decoder 1112 may decrypt all or a portion of the encrypted information of the SMS message. For example, the decoder 1112 may decrypt the authentication value to verify the authenticity of the message. In another particular embodiment, the relay server 1102 may not decrypt the SMS message. Rather, the relay server 1102 may generate an IP data message based on the SMS message without decrypting the SMS message.

In a particular embodiment, the relay server 1102 includes a keyword module 1114. The keyword module 1114 may be adapted to identify a keyword in a received SMS message and to determine an action to be taken based on the keyword. For example, the keyword module 1114 may examine a received SMS message to determine whether it includes a keyword identified in a keyword database 1118. When the SMS message includes a keyword associated with an SMS call process, the keyword module 1110 may cause a data post module 1116 to generate a data message, as described below.

The relay server 1102 may also include the data post module 1116. The data post module 1116 may be adapted to generate a data message based on the SMS message. In a particular embodiment, the data message may be generated as an IP message. The data message may be sent to a communication server, such as the VoIP gateway 1008 discussed with reference to FIG. 10. In response to the data message, the communication server may generate a callback to the mobile communication device that sent the SMS message. The communication server may also generate a call to a destination address in the SMS message. The communication server may also bridge the call to the mobile communication device and the call to the destination address. Thus, as a result of sending the SMS message, the mobile communication device may be connected to a device at the destination address via a voice call.

Figure 12:
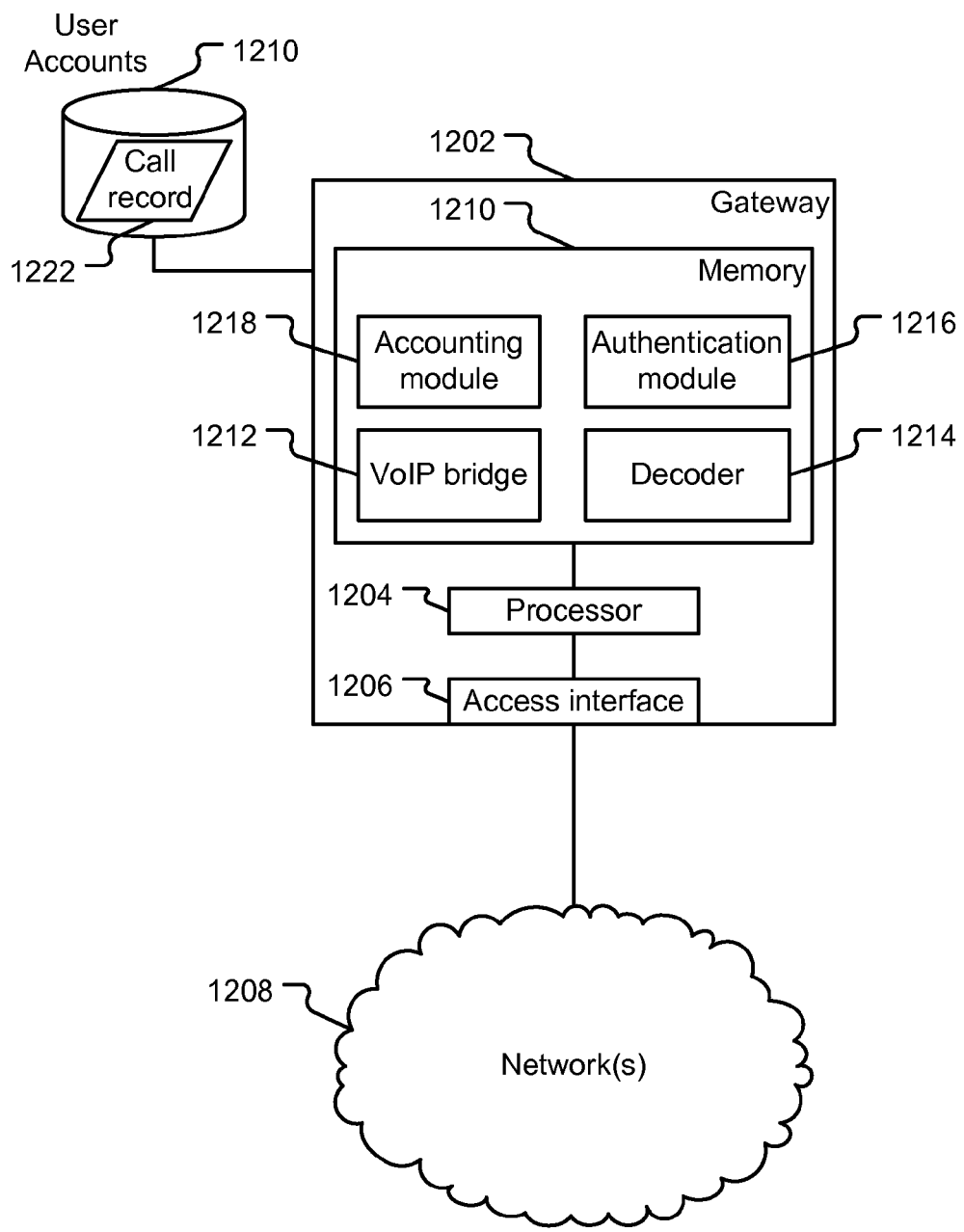
FIG. 12 is a diagram of a fifth embodiment of a system to initiating a call.

Referring to FIG. 12, a block diagram of a particular embodiment of a system to initiate a call is shown. The system includes a gateway 1202. In a particular embodiment, the gateway 1202 includes a Voice over Internet Protocol (VoIP) gateway, such as the VoIP gateway 1008 discussed with reference to FIG. 10. The gateway 1202 may be adapted to bridge communications between two or more communication devices using VoIP communications. For example, the gateway 1202 may include a VoIP bridge 1212. The VoIP bridge 1212 may facilitate communications between communication devices where at least one of the communication devices uses communication data in a VoIP format. In another example, each of the communication devices may send voice data using a telephony protocol and each of the communication devices may be coupled to a VoIP gateway. To illustrate, a first communication device may send communication data to a first VoIP gateway using a telephony protocol. The first VoIP gateway may convert the communication data to VoIP and send the VoIP communication data to a second VoIP gateway. The second VoIP gateway may convert the VoIP communication data to a telephony protocol and send the communication data to the second communication device.

In a particular embodiment, the gateway 1202 includes a processor 1204 and memory 1210 accessible to the processor 1204. The gateway 1202 may also include an access interface 1206. The access interface 1206 is adapted to facilitate communications via one or more networks 1208. For example, the access interface 1206 may be adapted to receive a data message from a mobile communication device.

The memory 1210 may include an authentication module 1216. The authentication module 1216 may be adapted to authenticate a data message received via the access interface 1206. For example, the data message may include a hash value generated using a known key. The authentication module 1216 may verify the hash value to authenticate that the data message was received from the mobile communication device. In a particular embodiment, at least a portion of the data message may be encrypted. The gateway 1202 may also include a decoder 1214 to decrypt the encrypted portion of the data message.

The gateway 1202 may also include an accounting module 1218. The accounting module 1218 may be adapted to store a call record 1222 related to a call processed by the gateway 1202. The call record 1222 may be associated with one or more user accounts 1220. In a particular embodiment, the call record 1222 may include information about the call, such as the mobile communication device that sent a data message to initiate the call, a destination address or destination device of the call, or any combination thereof.

Figure 13:
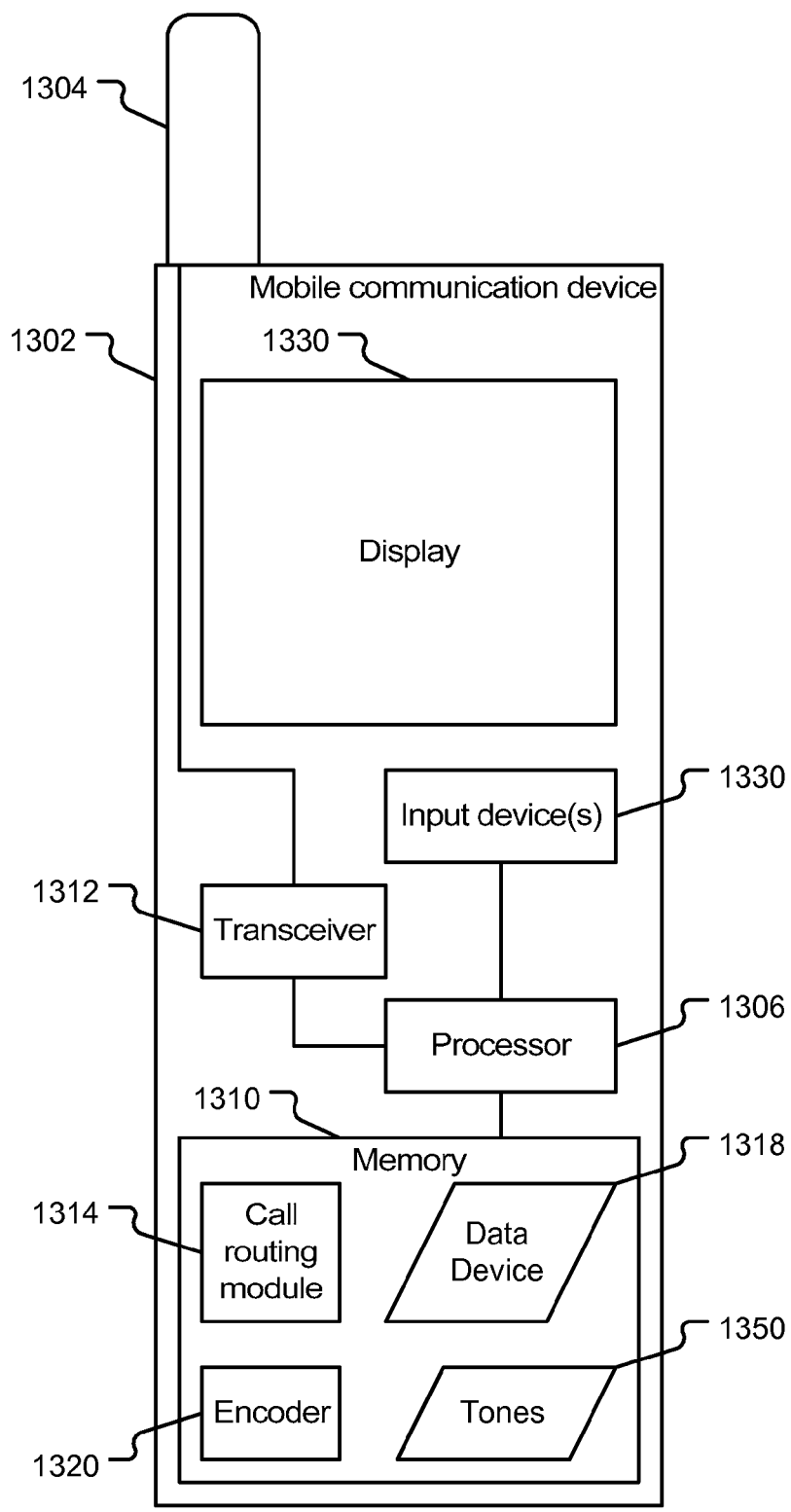
FIG. 13 is a diagram of a sixth embodiment of a system to initiating a call.

Referring to FIG. 13, a block diagram of a particular embodiment of a mobile communication device 1302 is illustrated. The mobile communication device 1302 may include an antenna 1304 and a transceiver 1312 coupled to the antenna 1304. The mobile communication device 1302 may also include a processor 1306 and a memory 1310 accessible to the processor 1306. The mobile communication device 1302 may further include one or more input devices 1308 and one or more output devices, such as display device 1330 or speaker (not shown).

In a particular embodiment, the mobile communication device 1302 includes a call routing module 1314. The call routing module 1314 is adapted to receive user input via the input devices 1308. For example, the input may include a destination communication address associated with a destination device. The call routing module 1314 may analyze the input to determine how to route the call. In a particular embodiment, the call may be routed as a direct call to the destination address (e.g., a traditional mobile telephone call), as an Internet Protocol (IP) call, as a short messaging service (SMS) call, or as a voice call to a Voice over IP call. To illustrate, the call routing module 1314 may generate an IP or SMS data message based at least partially on the destination communication address. The mobile communication device 1302 may send the data message to a communication server or relay server via the transceiver 1312. When the data message is sent to a relay server, the relay server may process the data message and send another data message to the communication server. In response to the data message, the communication server may generate a callback to the mobile communication device 1302. The call routing module 1314 may detect the callback from the communication server and automatically answers the callback without user input.

In a particular embodiment, the memory 1310 includes one or more prerecorded call progress tones 1350. The prerecorded call progress tones 1350 may be played via a speaker of the mobile communication device 1302 after sending the data message to the communication server and before receiving the callback. The mobile communication device 1302 may also include an encoder 1320. The encoder 1320 may be adapted to encrypt all or a portion of the data message.

The mobile communication device 1302 may also include device data 1318. The device data 1318 may include identification data associated with the mobile communication device 1302, such as caller identification information. In a particular embodiment, all of or a portion of the device data 1318 may be stored on a subscriber identity module (SIM) card. In a particular embodiment, at least a portion of the device data 1318 is stored on a SIM card. In this embodiment, when a user inserts a new SIM card, the call routing module 1314 or another module in the memory 1310 may detect that the new SIM card having new device data (not shown) has been received. The new device data may be sent to the communication server to update subscriber records associated with the user.

Figure 14:
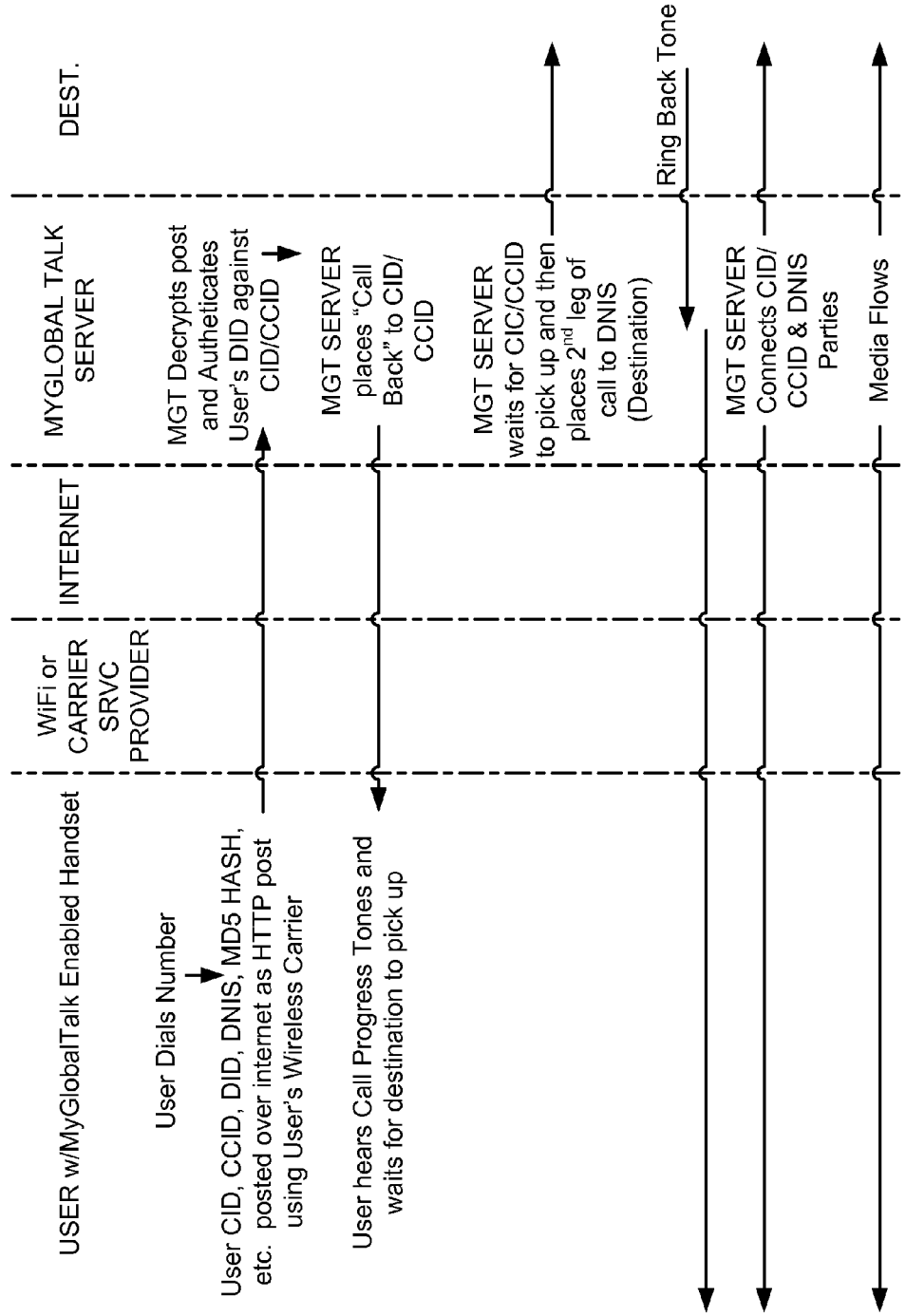
FIG. 14 is a flow chart of a fifth embodiment of a method of initiating a call.

FIG. 14 depicts a flow chart of a particular embodiment of a method of initiating a call. The method includes receiving a destination address via input from a user. For example, the user may dial a number associated with a destination device. In response to receiving the user input, a software application running on the user's mobile communication device may generate a data message. The data message may include identification information of the mobile communication device, the destination address, authentication information, and so forth. The data message may be sent to a communication server. The communication server may authenticate the data message and generate a callback to the mobile communication device. The communication server may also generate a call to the destination address. In an illustrative embodiment, the communication server may wait until the callback is answered at the mobile communication device before calling the destination address. The communication server may bridge the callback to the mobile communication device to the call to the destination address.

Figure 15:
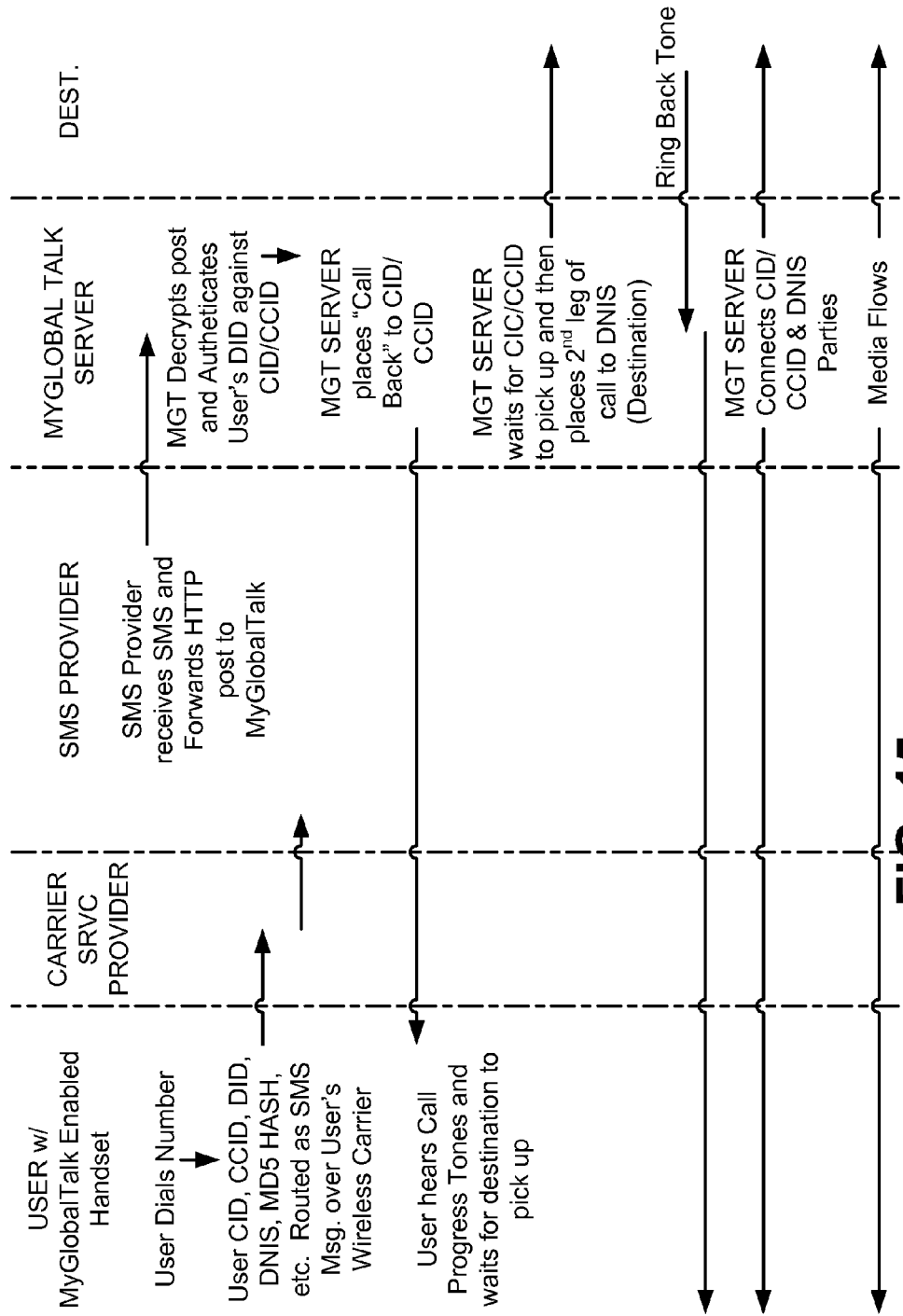
FIG. 15 is a flow chart of a sixth embodiment of a method of initiating a call.

FIG. 15 depicts a flow chart of a particular embodiment of a method of initiating a call. The method includes receiving a destination address via input from a user. For example, the user may dial a number associated with a destination device. In response to receiving the user input, a software application running on the user's mobile communication device may generate a data message included in a short messaging service (SMS) message. The mobile communication device may send the SMS message to an SMS service provider server. The SMS service provider may strip the data message from the SMS message and send the data message to a communication server. The communication server may authenticate the data message and generate a callback to the mobile communication device. The communication server may also generate a call to the destination address. In an illustrative embodiment, the communication server may wait until the callback is answered at the mobile communication device before calling the destination address. The communication server may bridge the callback to the mobile communication device to the call to the destination address.

Figure 16:
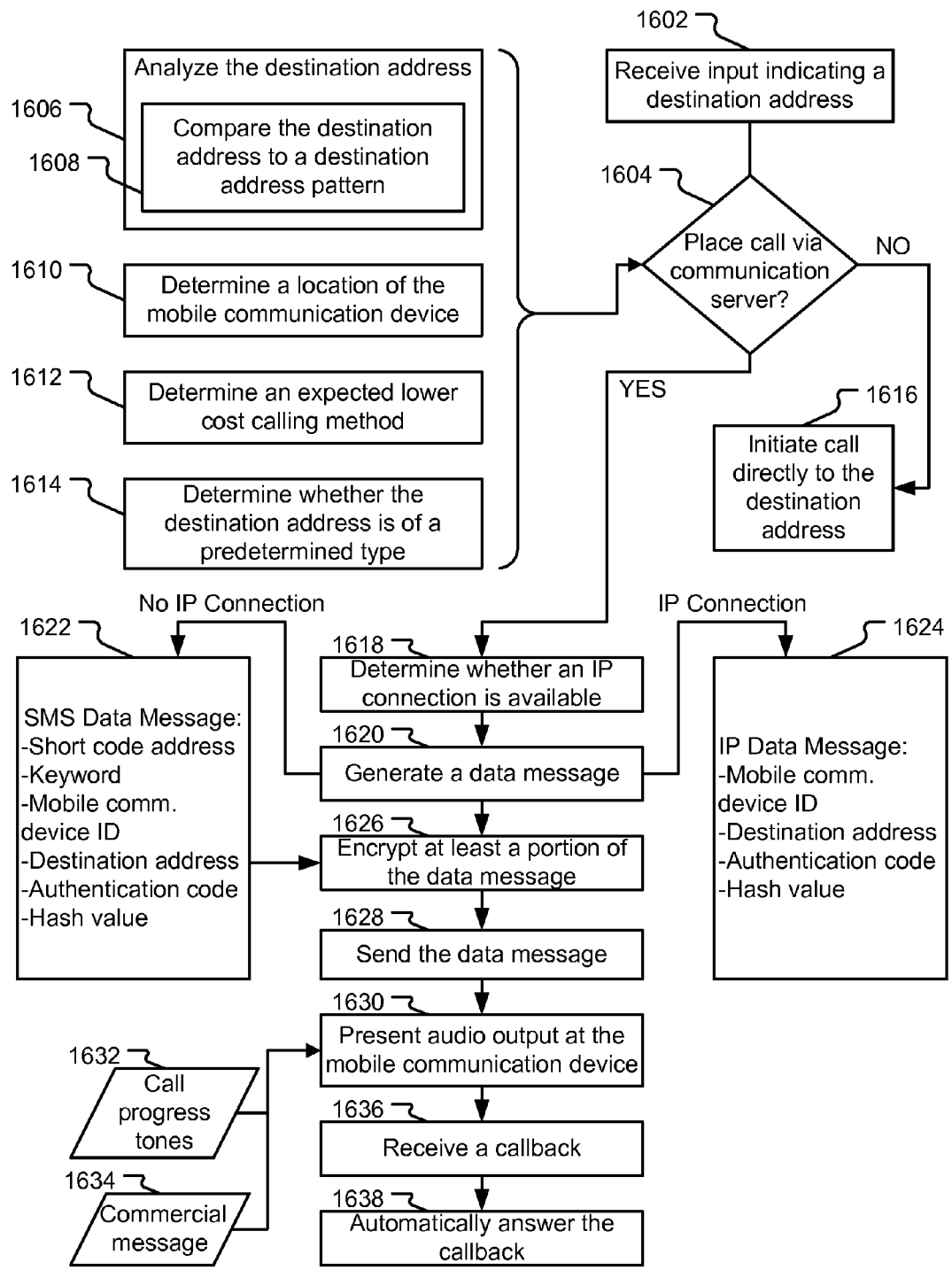
FIG. 16 is a flow chart of a seventh embodiment of a method of initiating a call.

Referring to FIG. 16, a particular embodiment of a method of initiating a call is illustrated. In an illustrative example, the method 1600 may be performed at a mobile communication device, such as the mobile communication device 104 of FIG. 1, the mobile communication device 202 of FIG. 2, the mobile communication device 1002 of FIG. 10 or the mobile communication device 1302 of FIG. 13.

The method may include, at 1602, receiving input indicating a destination address at a mobile communication device. The method may also include, at 1604, determining whether to place a call via a communication server. In a particular embodiment, determining whether to place the call via the communication server includes, at 1606, analyzing the destination address. For example, the destination address may be compared to a destination address pattern, at 1608. To illustrate, the destination address may be analyzed to determine whether it indicates a long distance call, a local call or international call. Determining whether to place the call via the communication server may include, at 1610, determining a location of the mobile communication device. Determining whether to place the call via the communication server may include, at 1612, determining an expected lower cost calling method. For example, the expected lower cost calling method may be estimated based on location of the mobile communication device, the location of the destination address, a calling plan of the communication device, other information, or any combination thereof. Determining whether to place the call via the communication server may include, at 1614, determining whether the destination address is of a predetermined type. For example, the predetermined type may include an international telephony address, a long-distance telephony address, a local address, or another type.

When the call is not to be placed via the communication server, the method may include, at 1616, initiating a call directly to the destination address. When the call is to be routed via the communication server, the method may include, at 1618, determining whether an Internet Protocol (IP) connection is available. The method also includes, at 1620, generating a data message based at least partially on the destination address. For example, the data message may include identification data of the mobile communication device, the destination address, an authentication code (e.g., a hash value based at least partially on an identifier of the mobile communication device and a key), a short code address associated with a short messaging service, other information, or any combination thereof.

When an IP connection is available, the data message may be generated as an IP data message 1624. For example, the data message may include a hypertext transfer protocol (HTTP) command string, such as an HTTP post command. The IP data message 1624 may also include mobile communication device identification information, the destination address, an authentication code, a hash value, or any combination thereof. When no IP connection is available, the data message may be generated as an SMS data message 1622. The SMS data message 1622 may include a short code address, a keyword, mobile communication device identification information, the destination address, an authentication code, a hash value, an HTTP command string, or any combination thereof. In a particular embodiment, the authentication code may be generated automatically by the communication device. That is, the authentication code may not be received from the user of the mobile communication device.

The method may also include, at 1626, encrypting at least a portion of the data message. The method may further include, at 1628, sending the data message to a communication server. The method may also include, at 1630, presenting audio output at the mobile communication device after sending the data message and before receiving a callback. In an illustrative embodiment, the audio output includes call progress tones 1632. In another illustrative embodiment, the audio output includes a commercial message 1634.

In response to the data message, the communication server may initiate a callback to the mobile communication device and a call to the destination address. The method may also include, at 1636, receiving the callback at the mobile communication device. The method may further include, at 1638, automatically answering the callback.

In a particular embodiment, a processor-readable medium includes instructions that, when executed by a processor (such as the processor 1306 of the mobile communication device 1302 illustrated in FIG. 13), cause the processor to generate a data message based at least partially on input indicating a destination address. The processor-readable medium also includes instructions that, when executed by the processor, cause the processor to send the data message to a communication server. In a particular embodiment, the communication server includes a Voice over Internet Protocol (VoIP) telephony bridge. The processor-readable medium also includes instructions that, when executed by the processor, cause the processor to play prerecorded audio data at the mobile communication device after sending the data message. In response to the data message, the communication server may initiate a callback to the mobile communication device and a call to the destination address. The processor-readable medium further includes instructions that, when executed by the processor, cause the processor to automatically answer the callback from the communication server and to connect the mobile communication device to the communication server via the callback.

In a particular illustrative embodiment, a user of the MYGLOBALTALK™ communication service may input a destination address. The application permits multiple methods of receiving the destination address, including: 1) Keypad, 2) Contacts, and 3) Call History. For example, the user may input a telephone number via a keypad, select a telephone number from a contacts list, input a voice command, or provide the destination communication address in some other manner. The application running on the user's mobile handset determines proper call routing based on the set-up options. For example, the application may estimate the cost of making the call via one or more calling methods (e.g., a direct call to the destination address, a call to the destination address via a Voice over Internet Protocol (VoIP) bridge, or a call via an automated callback from the VoIP bridge. In another example, the application may determine whether an IP connection (such as a WiFi, WiMax, 802.11x, 3G or other wireless IP connection) is available at the mobile handset. In each case, the application analyzes the destination address and routes the call according to the user's set up parameters. For example, the set up parameters may indicate a default call routing method that is to be used. In another example, the set up parameters may indicate criteria for selecting a call routing method. For example, the criteria may include one or more destination address patterns. The destination address may be compared to the destination address patterns, and a call routing method associated with a matching destination address pattern may be selected. The application also remembers its users, and whenever an update, new feature, or newer version of the application becomes available, the users can receive a notification on their handset with instructions on how to acquire the updates.

In a particular embodiment, the calling routing methods may include 1) a direct call to the destination address from the mobile handset, 2) a voice call to a VoIP bridge, 3) an IP call to generate a callback from the VoIP bridge ("IP Calling"), and 4) a short messaging service (SMS) call to generate a callback from the VoIP bridge ("SMS Calling"). Once the user has installed the software application and configured the handset to use IP Calling or SMS Calling the user is able to make a call over the handset with the calling protocol originating over the Internet. To illustrate, for IP Calling the user inputs the desired destination address (e.g., telephone number). The software application operates in the background, handling all the call processing transparent to the user. Once the user has input the destination address in the IP Calling mode, the application takes the destination address and creates a data message (e.g., an IP message, such as a Hypertext Transfer Protocol (HTTP) post message). The application sends the data message via the IP connection.

In a particular embodiment, the data message may include:
CID (Caller ID) data—User's Caller ID for their mobile handset;
CCID (Current Caller ID) data—User's Current CID if changed from the CID that was registered when the user account was set up (e.g. change in SIM cards);
DID (Direct Inward Dialing) data—User's phone number selected during account sign up;
DNIS (Dialed Number Identification Service) data—The destination address input by the user;
Authentication data, such as MD5 Hash data—the hash data may include a hash of the CID+CCID+DID+DNIS plus a salt value;
An ORIGIN Flag—Flag used to determine whether the post is from an IP Call or an SMS Call; and/or
A PLATFORM Flag—Flag used to determine a type or operating system of the originating handset (e.g., whether the handset is a Blackberry™, Windows Mobile™, Symbian™, iPhone™, or Android™ handset.
An illustrative data message may be:

http://servername.com/dial/?cid=xxxx&ccid=xxxx&did=xxxx&dnis=xxxx&hash=xxxx&orig=xxxx&platform=xxxx where "servername.com" indicates an address associated with the VoIP bridge, and "xxxx" represents values that may be different from data message to data message.

In a particular embodiment, an additional layer of security may be used. In this embodiment, the CID, CCID, DID, DNIS, or any combination thereof are encrypted so that these values do not appear in plaintext in the data message. The encryption string may consist of the parameters: CID+CCID+DID+DNIS+MD5 HASH and may be encrypted using an encryption algorithm such as the Advanced Encryption Standard ("AES") algorithm. In an illustrative embodiment, the ORIGIN and PLATFORM parameters are not encrypted, since they do not include user or mobile device specific data. A sample of a data message according to this embodiment is:

```
http://servername.com/dial/?e=SDE2WlIGXdjjw+imxnvK+
OznG/WlFv8/MgLzZOamDLsWMZ+A==&orig=xx&platform=xx
```

After the software application sends the data message, the data message is routed to a server. The server receives the data message and, if a portion of the data message is encrypted, decrypts the data message using the agreed upon algorithm and key. The server also computes the MD5 HASH using the same salt value as was used to generate the hash. If both the decryption and the MD5 HASH processes validate the data message, the server initiates a callback process.

In a particular embodiment, IP Calling processing includes (See FIG. 14, IP Calling Flow Diagram):

1. User dials from Keypad, Contacts, or Call History (i.e., normal dialing) at a handset.
2. The software application running on the handset receives the dial sequence and generates a data message (such as an HTTP post) and sends it via an IP connection to a server associated with the MYGLOBALTALK™ communication service.
3. After the data message is sent:
    a. The software application may play call progress tones to the user, e.g., while the data message is being routed and authenticated. The call progress tones can include simple audio tones, WAV file, MP3 file, commercial messages, etc.
    b. When the software application detects that a "call back" from the server is received, the software application may stop the playback of the call progress tones, automatically answer the "callback", and bridge the in-coming audio to the handset's speaker.
    c. The user may then hear the far end ring from the destination address.
4. After the data message is sent, the server associated with the MYGLOBALTALK™ communication service:
    a. May determine whether the data message is authenticated.
        i. If authentication is successful, the server places a callback to the CID or the CCID that was in the data message. That is, the callback is placed to the handset that originated the data message.
        ii. If authentication fails, the data message may be dropped and no further processing takes place.
    b. The server waits for an answer at the handset that originated the data message.
    c. After the callback is answered, the server places a call to the destination address (e.g., the DNIS parameter in the data message).
    d. When a party at the destination address answers the call, media (e.g., voice data) is passed between the handset that originated the data message and the destination address.
5. After either party terminates their end of the call, the server may make entries into a billing system and call processing completes.

In a particular embodiment, SMS Calling involves a call processing sequence which is similar to IP Calling. However, in SMS Calling the data message is sent as an SMS message. The SMS message includes information similar to the HTTP post described above. In a particular embodiment, the SMS message is sent to an SMS provider who in turn generates the HTTP post and sends the HTTP post to a server associated with the MYGLOBALTALK™ communication service. In a particular embodiment, the SMS Calling process includes the following processing sequence (See FIG. 15, SMS Calling):

1. A user dials from Keypad, Contacts, or Call History (i.e., normal dialing) of a handset.
2. The software application running on the handset receives the dial sequence and generates an SMS message of the form:
    a. 99999; KEYWORD; HTTP post.
        i. 99999—This field includes a Common Short Code assigned for SMS Calling (99999 is only representational).
        ii. KEYWORD—This field includes a keyword which designates SMS Calling (KEYWORD is only representational)
        iii. HTTP post—This is the same HTTP post as described above for IP Calling.
3. SMS Provider Call Processing:
    a. The SMS provider receives the SMS message and may decode the KEYWORD.
    b. The SMS provider may then strip the contents of the SMS message after the KEYWORD and forward it as a data message to the server associated with the MYGLOBALTALK™ communication service over the Internet or another IP network.
4. After the data message is sent:
    a. The software application may play call progress tones to the user, e.g., while the data message is being routed and authenticated. The call progress tones can include simple audio tones, WAV file, MP3 file, commercial messages, etc.
    b. When the software application detects that a "call back" from the server is received, the software application may stop the playback of the call progress tones, automatically answer the "callback", and bridge the in-coming audio to the handset's speaker
    c. The user may then hear the far end ring from the destination address.
5. After receiving the data message, the server associated with the MYGLOBALTALK™ communication service:
    a. May determine whether the data message is authenticated.
        i. If authentication is successful, the server places a callback to the CID or the CCID that was in the data message. That is, the callback is placed to the handset that originated the data message.
        ii. If authentication fails, the data message may be dropped and no further processing takes place.
    b. The server waits for an answer at the handset that originated the data message.
    c. After the callback is answered, the server places a call to the destination address (e.g., the DNIS parameter in the data message).
    d. When a party at the destination address answers the call, media (e.g., voice data) is passed between the handset that originated the data message and the destination address.
6. After either party terminates their end of the call, the MYGLOBALTALK™ communication server may make entries into a billing system and call processing completes.

In various embodiments, IP Calling and SMS Calling can result in significant cost savings over traditional calling methods. As an example, when the user is traveling in a foreign country and wants to call their country of origin and the user's mobile handset uses a SIM card, the user may place the call as an IP call. To place the call as an IP call, the user's handset accesses the Internet to send the data message (using the handset's data plan, which may include a certain number of pre-paid minutes or other units for data calls). Once the data message is sent, the user's handset disconnects. Thus, the data call is relatively short. When the data message is received at a server associated with the MYGLOBALTALK™ communication service, the server generates a callback to the user's handset, as a first leg of a call. Many mobile communication service providers do not charge for incoming calls, thus, the callback may be a free call for the user. While the user is connected on the first leg of the call, the server calls the destination address, as a second leg of the call. The server then connects the first leg of the call and the second leg of the call, allowing the user and a called party to communicate with each other. In this example, the user may only pay a small data fee (if any is charged) and a Voice over Internet Protocol (VoIP) service provider's calling fees. In many instances, the VoIP service provider's rates may be substantially less than international roaming rates or international long distance rates. The VoIP service provider's rates may also be lower than rates charged by a mobile communication service provider for outgoing calls.

In another example, when SMS Calling is used, a user traveling in a foreign country may place a call to their country of origin. In this example, the user dials as normal. The software application checks to see whether an Internet Protocol (IP) connection is available. If there is no IP connection available, an SMS message (as described above) is sent. After the SMS service provider receives the SMS message, the SMS service provider sends a data message to a server associated with the MYGLOBALTALK™ communication service, which processes the data message to generate a callback to the user's handset and a call to the destination address. In this example, the user may only pay for the cost of sending the SMS message because, as discussed above, the callback to the user's handset is an incoming call, which may be a free call depending on the mobile communication service provider's policies. Also in this example, the user pays the VoIP service provider's rates.

In a particular embodiment, information used to associate the user with a MYGLOBALTALK™ communication service user account may be stored in the SIM card. When the user inserts a new SIM card into the handset, the new SIM card may be associated with different information and the new information may not be associated with the user's account. To ensure that calls from the user are processed properly at the server, the software application may detect when a new SIM card is inserted into the handset. In response to the insertion of a new SIM card, the software application may send a message to the server to update subscriber records associated with the user to include identification information associated with the new SIM card. In a particular embodiment, the software application may request that the user provide authentication information at the handset (e.g., a user name and password) before updating the user's subscriber account to mitigate the risk fraud.

Figure 17:
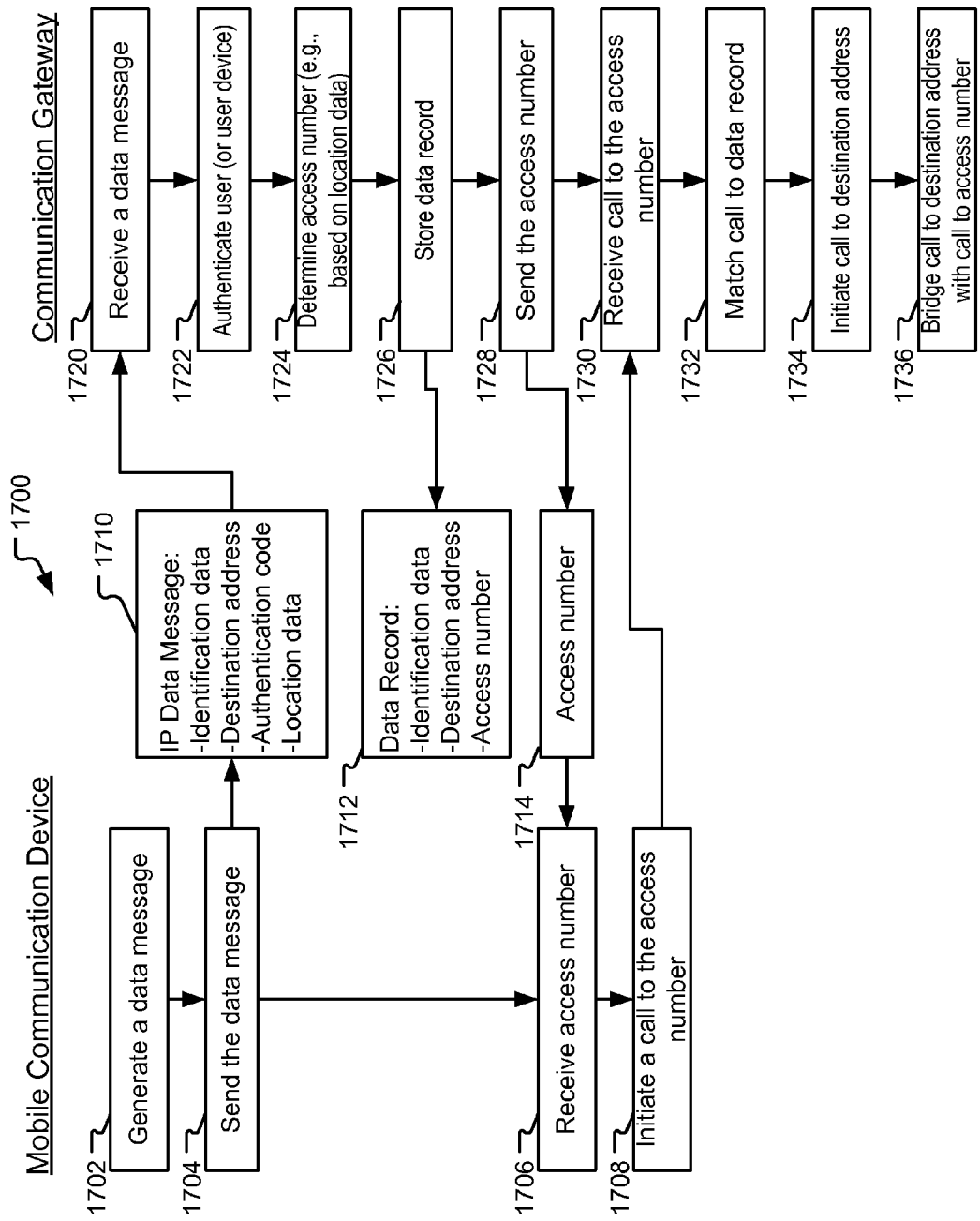
FIG. 17 is a flow chart of an eighth embodiment of a method of initiating a call.

FIG. 17 is a flow chart of an eighth embodiment of a method of initiating a call. The method is generally designated 1700. In various embodiments, the method 1700 may be performed by a communication device (such as the mobile communication device 104 of FIG. 1, the mobile communication device 202 of FIG. 2, the mobile communication device 1002 of FIG. 10, or the mobile communication device 1302 of FIG. 13) and a communication gateway (such as the server system 108 of FIG. 1, the VoIP gateway 1008 of FIG. 10, or the gateway 1202 of FIG. 12). The method 1700 may include, at 1702, a mobile communication device generating a data message 1710. For example, the mobile communication device may generate the data message 1710 in response to a user dialing a telephone number or another network address. To illustrate, the user may enter a number via a keypad of the mobile communication device, select a number from a contact list, provide the number via a voice input, or enter the number in another manner.

The data message 1710 may be generated using an Internet Protocol (IP) for communication via an IP compatible wireless network. In a particular embodiment, the data message 1710 includes identification data related to the mobile communication device, related to the user, or related to an account of the user, or any combination thereof. For example, the identification data may include caller identification (ID) data, an electronic serial number of the mobile communication device, a user name or other user identification code, other identification information, or any combination thereof. The data message 1710 may also include an authentication code. In a particular embodiment, the authentication code and the identification data are combined. That is, the authentication code and the identification data may be the same data. The authentication data may be used by a communication gateway to determine whether the mobile communication device is authorized to use the communication gateway to route calls.

In a particular embodiment, the data message 1710 includes a destination address associated with a destination device being called. For example, the destination address may include the telephone number or other network address dialed by the user. In a particular embodiment, the data message 1710 includes location data. For example, the location data may include a coordinate location of the mobile communication device, or more general location information (such as information describing a geographic region where the mobile communication device is located). To illustrate, the mobile communication device may include a global positioning system (GPS) receiver that is adapted to receive GPS signals and to determine the location data based on the GPS signals. Alternately, the mobile communication device may also receive control signals from a mobile communication network providing wireless communication services to the mobile communication device. The control signals may include information descriptive of the location of the mobile communication device, or the control signals (or other signals from the communication network) may be used to triangulate or otherwise estimate the location of the mobile communication device to determine the location data. The method 1700 may also include, at 1704, sending the data message 1710 to the communication gateway.

The communication gateway may receive the data message 1710, at 1720. The communication gateway may authenticate the user or the mobile communication device based on the data message 1710, at 1722. For example, the communication gateway may determine based on the identification data, the authentication data, or both, whether the user is authorized to route calls via the communication gateway.

The method 1700 may also include, at 1724, determining an access number 1714 to be provided to the mobile communication device. The access number 1714 is a number that can be called by the mobile communication device to access the communication gateway. In a particular embodiment, the access number 1714 may be determined based on the location data. For example, the access number 1714 may be selected to be local to the mobile communication device so that the mobile communication device does not have to call a long distance number to access the communication gateway.

At 1726, the communication gateway may store a data record 1712 that associates the destination address with the access number 1714. For example, the data record 1712 may include the identification data, the destination address and the access number 1714. The communication gateway may also send the access number 1714 to the mobile communication device, at 1728. For example, the communication gateway may send an IP message that includes the access number 1714 to the mobile communication device. In another example, the communication gateway may send the access number 1714 to the mobile communication device using another communication protocol, such as short-messaging service (SMS) protocol.

At 1706, the mobile communication device may receive the access number 1714. In response to receiving the access number 1714, the mobile communication device may initiate a call to the access number 1714, at 1708. In a particular embodiment, the mobile communication device may automatically dial the access number 1714 when it is received. That is, in response to the user entering the destination address, as discussed above, the mobile communication device may automatically communicate with the communication gateway to determine the access number 1714 and may automatically dial the access number 1714 rather than the destination address, without further input from the user. To illustrate, as discussed with reference to the MYGLOBAL-TALK™ communication service, the mobile communication device may determine (e.g., based on user settings, the destination address, the location of the mobile communication device, other factors, or any combination thereof) whether to route the call through the communication gateway or to route the call via a public switch telephone network (PSTN) to the destination address.

At 1730, the communication gateway may receive the call to the access number 1714 from the mobile communication device. The communication gateway may match the call to the data record 1712, at 1732. For example, the communication gateway may search a database of records to identify the data record 1712 based on the identification data associated with the mobile communication device, based on the access number 1714 called by the mobile communication device, or both.

At 1734, the communication gateway may initiate a call to the destination address based on the data record 1712. In a particular embodiment, the call to the destination address is a Voice over Internet Protocol (VoIP) call routed via a voice and data network. The communication gateway may bridge the call to the destination address to the call with the access number 1714 from the mobile communication device, at 1736. Thus, the mobile communication device may be automatically connected to a VoIP call based on a destination address dialed at the mobile communication device.

By sending the destination address in the data message 1710 when the mobile communication device initially contacts the communication gateway, there may be a reduced risk that a loss of communication between the mobile communication device and the communication gateway will inhibit completion of the call. For example, even if there is a loss of communication between the mobile communication device and the communication gateway after the data message 1710 is received at the communication gateway, the call may be completed. To illustrate, the communication gateway may send the access number 1714 to the mobile communication device one or more times until the access number 1714 is successfully received by the mobile communication device. Similarly, the mobile communication device may dial the access number 1714 one or more time until communication with the communication gateway is established. Both sending the access number 1714 to the mobile communication device and dialing the access number occur in the background from the user's perspective. That is, the user does not need to take further action after dialing the destination address. Additionally, sending the location data via the data message 1710 may enable automatic selection of the access number 1714 to reduce costs of the call.

The present disclosure contemplates a processor-readable medium (or computer-readable medium) that includes instructions or that receives and executes instructions, so that a device connected to a network can communicate voice, video or data over the network. Further, the instructions may be transmitted or received over the network via a network interface device. The terms "processor-readable medium" and "computer-readable medium" include a single medium or multiple media, such as a centralized or distributed database, and/or associated caches and servers that store one or more sets of instructions. The term "processor-readable medium" and "computer-readable medium" include any medium that is capable of storing, encoding or otherwise tangibly embodying a set of instructions for execution by a processor or that cause a computer system to perform any one or more of the methods or operations disclosed herein.

In a particular non-limiting, exemplary embodiment, the processor-readable medium can include a solid-state memory such as a memory card, SIM card or other package that houses one or more non-volatile read-only memories. Further, the processor-readable medium can be a random access memory or other volatile re-writable memory. Additionally, the processor-readable medium can include a magneto-optical or optical medium, such as a disk or tapes or other storage device. Accordingly, the disclosure is considered to include any one or more of a processor-readable medium and other equivalents and successor media, in which data or instructions may be stored.

Unless otherwise noted, where the present disclosure refers to various systems, subsystems, servers, logic or modules, the systems, subsystems, servers, logic or modules may include hardware devices, software, or firmware (e.g., a combination of hardware and software). For example, a particular system, subsystem, server, logic or module may include a processor and memory accessible to the processor, where the memory includes instructions executable by the processor to cause the processor to perform various functions. In another example, a particular system, subsystem, server, logic or module may include an application specific integrated circuit adapted to perform various functions. In yet another example, a particular system, subsystem, server, logic or module may include both circuit elements and instructions that are executable to cause the circuit elements to perform various functions. Thus, the systems, subsystems, servers, logic or modules may include physical devices, the operation of which may generate tangible results.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP, VOIP, SIP) represent examples of the state of the art. Such standards are periodically superseded by faster or more efficient equivalents having essentially the same functions. Accordingly, replacement standards and protocols having the same or similar functions as those disclosed herein are considered equivalents thereof. Additionally, although various embodiments are described with reference to the MYGLOBALTALK™ communication service, the disclosure is not limited to the MYGLOBALTALK™ communication service. Rather, the MYGLOBALTALK™ communication service is used as an example of a particular example that illustrates certain features of the disclosure. Accordingly, where the MYGLOBALTALK™ communication service is referenced, other communication services, systems and software applications may be considered equivalents where they perform the same or similar functions.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   a. receiving, at a mobile communication device, input indicating a destination address;
   b. generating a data message based at least partially on the destination address, wherein generating the data message further comprises determining whether an Internet Protocol (IP) connection is available at the mobile communication device, wherein the data message is generated as an IP message in response to determining that the IP connection is available and the data message is generated as a Short Messaging Service (SMS) message in response to determining that the IP connection is not available;
   c. sending the data message to a communication server, wherein in response to the data message, the communication server initiates a callback to the mobile communication device;
   d. answering automatically, at the mobile communication device, the callback from the communication server, wherein the communication server initiates a call to the destination address after the mobile communication device automatically answers the callback; and
   e. further comprising, after receiving the input indicating the destination address, automatically determining whether to place the call via the communication server, wherein the data message is sent to the communication server when the call is to be placed via the communication server.

2. The method of claim 1, wherein the data message comprises a hypertext transfer protocol command string.

3. The method of claim 1, wherein the data message includes identification data of the mobile communication device.

4. The method of claim 1, wherein the data message includes the destination address.

5. The method of claim 1, wherein the data message includes an authentication code.

6. The method of claim 5, wherein the authentication code comprises a hash value based at least partially on an identifier of the mobile communication device and a key.

7. The method of claim 5, wherein the authentication code is not received from a user at the mobile communication device.

8. The method of claim 1, further comprising encrypting at least a portion of the data message.

9. The method of claim 1, wherein the data message includes a short code address associated with a short messaging service.

10. The method of claim 1, wherein automatically determining whether to place the call via the communication server comprises determining whether the destination address is of a predetermined type.

11. The method of claim 10, wherein the predetermined type comprises an international telephony address.

12. The method of claim 10, wherein the predetermined type comprises a long-distance telephony address.

13. The method of claim 10, wherein determining whether the destination address is of a predetermined type comprises comparing the destination address to a destination address pattern.

14. The method of claim 1, further comprising initiating a call directly to the destination address from the mobile communication device when the call is not to be placed via the communication server.

15. The method of claim 1, wherein automatically determining whether to place the call via the communication server comprises analyzing the destination address.

16. The method of claim 1, wherein automatically determining whether to place the call via the communication server comprises determining a location of the mobile communication device.

17. The method of claim 1, wherein automatically determining whether to place the call via the communication server comprises determining an expected lower cost calling method.

18. The method of claim 1, further comprising presenting audio output at the mobile communication device after sending the data message and before receiving the callback.

19. The method of claim 18, wherein the audio output comprises call progress tones.

20. The method of claim 18, wherein the audio output comprises a commercial message.

21. A non-transitory processor-readable medium, comprising:
   a. instructions that, when executed by a processor, cause the processor to generate a data message based at least partially on input received at a mobile communication device indicating a destination address, wherein the instructions further cause the processor to determine whether an Internet Protocol (IP) connection is available at the mobile communication device, wherein the data message is generated as an IP message in response to determining that the IP connection is available and the data message is generated as a Short Messaging Service (SMS) message in response to determining that the IP connection is not available;
   b. instructions that, when executed by the processor, cause the processor to send the data message to a communication server, wherein in response to the data message, the communication server initiates a callback to the mobile communication device;
   c. instructions that, when executed by the processor, cause the processor to automatically answer the callback from the communication server, wherein the communication server initiates a call to the destination address after the mobile communication device automatically answers the callback; and
   d. instructions that, when executed by the processor, cause the processor after receiving the input indicating the destination address, to automatically determine whether to place the call via the communication server, wherein the processor sends the data message to the communication server when the call is to be placed via the communication server.

22. The non-transitory processor-readable medium of claim 21, wherein the instructions are executable by a processor of the mobile communication device.

23. The non-transitory processor-readable medium of claim 21, wherein the communication server comprises a Voice over Internet Protocol (VoIP) telephony bridge.

24. A mobile communication device comprising:
   a. an input device to receive input indicating a destination communication address;
   b. a call routing module to generate a data message based at least partially on the destination communication address;
   c. a transceiver to send the data message to a communication server, and to receive a callback from the communication server in response to the data message; and
   d. a memory and prerecorded call progress tones stored in the memory, wherein one or more of the prerecorded call progress tones are played via the mobile communication device after sending the data message to the communication server and before receiving a response from the communication server;
   wherein the call routing module is further operable to detect the callback from the communication server and to automatically answer the callback from the communication server, wherein the communication server initiates a call to the destination communication address after the mobile communication device answers the callback; and
   wherein the call routing module is further operable, after receiving the input indicating the destination communication address, to automatically determine whether to place the call via the communication server, wherein the data message is sent to the communication server when the call is to be placed via the communication server.

25. The mobile communication device of claim 24, wherein the call routing module is further adapted to detect insertion of a new subscriber identity module (SIM) card at the mobile communication device, and to send information to update subscriber account records to include identification information associated with the new SIM card.

* * * * *